(12) United States Patent
Plusquellic

(10) Patent No.: US 11,880,468 B2
(45) Date of Patent: Jan. 23, 2024

(54) AUTONOMOUS, SELF-AUTHENTICATING AND SELF-CONTAINED SECURE BOOT-UP SYSTEM AND METHODS

(71) Applicant: UNM Rainforest Innovations, Albuquerque, NM (US)

(72) Inventor: James Plusquellic, Albuquerque, NM (US)

(73) Assignee: UNM Rainforest Innovations, Albuquerque, NM (US)

( * ) Notice: Subject to any disclaimer, the term of this patent is extended or adjusted under 35 U.S.C. 154(b) by 676 days.

(21) Appl. No.: 16/961,614

(22) PCT Filed: Jan. 11, 2019

(86) PCT No.: PCT/US2019/013229
§ 371 (c)(1),
(2) Date: Jul. 10, 2020

(87) PCT Pub. No.: WO2019/140218
PCT Pub. Date: Jul. 18, 2019

(65) Prior Publication Data
US 2020/0342112 A1 Oct. 29, 2020

Related U.S. Application Data

(60) Provisional application No. 62/637,564, filed on Mar. 2, 2018, provisional application No. 62/616,816, filed on Jan. 12, 2018.

(51) Int. Cl.
*G06F 21/57* (2013.01)
*G06F 21/64* (2013.01)
*G06F 21/78* (2013.01)
*G06F 21/60* (2013.01)
*H03K 3/03* (2006.01)

(52) U.S. Cl.
CPC .......... *G06F 21/575* (2013.01); *G06F 21/602* (2013.01); *G06F 21/64* (2013.01); *G06F 21/78* (2013.01); *H03K 3/0315* (2013.01)

(58) Field of Classification Search
CPC ...... G06F 21/575; G06F 21/602; G06F 21/64; G06F 21/78; H03K 3/0315
USPC ............................................... 713/1, 2, 100
See application file for complete search history.

(56) References Cited

U.S. PATENT DOCUMENTS

| | | | |
|---|---|---|---|
| 6,388,533 B2 | 5/2002 | Swoboda | |
| 9,208,355 B1 * | 12/2015 | Areno | H04L 9/0866 |
| 2015/0012737 A1 * | 1/2015 | Newell | G06F 21/44 |
| | | | 713/2 |
| 2019/0026457 A1 * | 1/2019 | Plusquellic | G06F 21/70 |

FOREIGN PATENT DOCUMENTS

WO 2017/123631 7/2017

OTHER PUBLICATIONS

International Search Report and the Written Opinion of the ISA/RU, dated Apr. 15, 2019.

* cited by examiner

*Primary Examiner* — Michael J Brown
(74) *Attorney, Agent, or Firm* — Valauskas Corder LLC

(57) ABSTRACT

The invention is directed to an autonomous, self-authenticating and self-contained secure boot-up system and methods for field programmable gate arrays (FPGAs) that leverages physical unclonable functions (PUFs).

24 Claims, 14 Drawing Sheets

| Column/Row No. | 1 | 2 | | | | | | | 3 | | | | | | | | 4 | 5 | 6 |
|---|---|---|---|---|---|---|---|---|---|---|---|---|---|---|---|---|---|---|---|
| 1 | MPS | SWcon configuration 0 | | | | | | | SWcon configuration 1 | | | | | | | | SWcon 2-7 | Ave | MPSOffset |
| 2 | | TP | | | | | | | | | | | | | | | | | |
| | | 0 | 1 | 2 | 3 | 4 | 5 | 6-31 | 0 | 1 | 2 | 3 | 4 | 5 | 6 | 7-31 | 0-31 | | |
| 3 | 0 | 91 | 113 | 128 | 128 | 128 | 128 | ... | 65 | 86 | 119 | 122 | 128 | 128 | 128 | ... | ... | NA | NA |
| 4 | 1 | 17 | 39 | 71 | 74 | 113 | 128 | ... | 0 | 11 | 45 | 49 | 87 | 107 | 128 | ... | ... | NA | NA |
| 5 | Diffs | 74 | 74 | NA | NA | NA | NA | ... | NA | 75 | 74 | 73 | NA | NA | NA | ... | ... | 74.4375 | 74.4375 |
| 6 | 1 | 17 | 39 | 71 | 74 | 113 | 128 | ... | 0 | 11 | 45 | 49 | 87 | 107 | 128 | ... | ... | NA | NA |
| 7 | 2 | 0 | 0 | 23 | 27 | 67 | 86 | ... | 0 | 0 | 0 | 0 | 41 | 61 | 82 | ... | ... | NA | NA |
| 8 | Diffs | NA | NA | 48 | 47 | 46 | 46 | ... | NA | NA | NA | NA | 46 | 46 | NA | ... | ... | 46.5625 | 121.0000 |

FIG. 8

AUTONOMOUS, SELF-AUTHENTICATING AND SELF-CONTAINED SECURE BOOT-UP SYSTEM AND METHODS

CROSS-REFERENCE TO RELATED APPLICATIONS

This invention claims priority to U.S. Provisional Patent Application Ser. No. 62/616,816 filed Jan. 12, 2018 and 62/637,564 filed Mar. 2, 2018, each incorporated herein by reference in entirety.

FIELD OF THE INVENTION

The invention relates generally to field programmable gate arrays (FPGA). More specifically, the invention relates to a system and methods for FPGAs to boot-up from power in a secure way by self-authenticating an unencrypted FPGA configuration bitstream loaded into the FPGA during start-up.

BACKGROUND OF THE INVENTION

Security and trust have become critically important for a wide range of existing and emerging microelectronic systems including those embedded in aerospace and defense, Industrial Control Systems (ICS) and Supervisory Control and Data Acquisition (SCADA) environments, automotive and autonomous vehicles, data centers, communications and medical healthcare devices. The vulnerability of these systems is increasing with the proliferation of internet-enabled connectivity and unsupervised in-field deployment.

Authentication and encryption are heavily used for ensuring data integrity and privacy of communications between communicating devices. The security of the system depends on the key being securely stored and remaining private within the chip when encryption and decryption is taking place. Unfortunately, these assumptions are no longer valid, and in fact, adversaries may apply invasive and semi-invasive techniques, generally referred to as side-channel techniques, to extract information from chips that was traditionally considered private. SRAM-based FPGAs need to protect the programming bitstream against reverse engineering and bitstream manipulation (tamper) attacks. It should be noted that the term "bitstring" and "bitstream" are used interchangeably to refer to a sequence of bits. Fielded systems, or systems engaged in practical work in a natural environment, are often the targets of attack by adversaries seeking to steal intellectual property (IP) through reverse engineering, or attempting to disrupt operational systems through the insertion of kill switches known as hardware Trojans. Internet-of-things (IoT) systems are particularly vulnerable given the resource-constrained and unsupervised nature of the environments in which they operate.

Secure boot-up within an FPGA environment is traditionally implemented using hardwired embedded cryptographic primitives and NVM-based keys, whereby an encrypted bitstream is decrypted as it is loaded from an external storage medium, e.g., Flash memory. FPGAs implementing secure boot-up usually store an encrypted version of the programming bitstream in an off-chip non-volatile memory (NVM) as a countermeasure to these types of attacks. Modern FPGAs provide on-chip battery-backed RAM and/or fuses for storage of a decryption key, which is used by vendor-embedded encryption hard-ware functions, e.g., Advanced Encryption Standard (AES) algorithm within the FPGA to decrypt the bitstream as it is read from the external NVM during the boot-up process. Recent attack mechanisms have been shown to read out embedded keys such that on-chip key storage threatens the security of the boot-up process.

Although FPGA companies embed cryptographic primitives to encrypt and authenticate bitstreams as a means of inhibiting reverse engineering and fault injection attacks, such attacks continue to evolve. For example, a technique exists that manipulates cryptographic components embedded in the bitstream as a strategy to extract secret keys. In addition, there is a fault injection attack on an FPGA bitstream that accomplishes the same goal where faulty cipher texts are generated by fault injection and then used to recover the keys. A hardware Trojan insertion strategy also exists which is designed to weaken FPGA-embedded cryptographic engines.

There are multiple ways to store the secret cryptographic keys in an embedded system. While one of the conventional methods is to store them in Non-Volatile Memory (NVM), extracting cryptographic keys stored in NVMs makes these schemes insecure. Battery Backed RAMs (BBRAM) and E-Fuses are also used for storing keys in FPGAs. BBRAMs complicate and add cost to system design because of the inclusion and limited lifetime of the battery. E-Fuses are one-time-programmable (OTP) memory and are vulnerable to semi-invasive attacks designed to read out the key via scanning technologies, such as scanning electron microscopes (SEM). These types of issues and attacks on NVMs are mitigated by Physical Unclonable Functions (PUF), which do not require a battery and do not store secret keys in digital form on the chip.

Accordingly, there is a need for FPGAs to boot-up from power in a secure way. The invention satisfies this need.

SUMMARY OF THE INVENTION

The present invention is directed to a system and methods for self-authenticating an unencrypted FPGA configuration bitstream loaded into the FPGA during start-up. The internal configuration access port (ICAP) interface is accessed to read-out configuration information of the unencrypted bitstream, which is then used as input to SHA-3 to generate a digest. In contrast to conventional authentication where the digest is computed and compared with a second pre-computed value, the digest is used as challenges to a hardware-embedded delay physical unclonable function (PUF) referred to as HELP, which utilizes the existing path delays of a design to generate a random and stable bitstring of desired length with minimal area and performance overhead. Another embodiment of the invention regenerates a decryption key by measuring variations in path delays that occur.

Challenges are applied to the components of the PUF engine both as a means of generating a key and performing self-authentication. The delays of the paths sensitized by the challenges are used to generate a decryption key using the HELP algorithm. Any modifications made to the PUF architecture results in key generation failure, and failure of subsequent stages of the secure boot-up process. The generated key is used in the second stage of the boot-up process to decrypt the programmable logic portion of the design as well as components of the software, e.g., Linux operating system and applications, that run on the processor side of the FPGA. More specifically, the decryption key is used in the second stage of the boot-up process to decrypt the operating system (OS) and applications.

The decryption key follows that any type of malicious tampering with the unencrypted bitstream changes the challenges and the corresponding decryption key, resulting in key regeneration failure. A ring-oscillator is used as the clock to make the process autonomous (and unstoppable) and a unique on-chip time-to-digital-converter is used to measure path delays, making the proposed boot process completely self-contained, i.e., implemented entirely within the reconfigurable fabric and without utilizing any vendor-specific FPGA features.

According to the invention, PUF-based key generation strategies address the vulnerability of on-chip key storage. Secure boot-up techniques according to the invention are referred to as BulletProof Boot for FPGAs (BulletProofF) and Self Authenticated Secure Boot (SASB), which are self-contained in that none of the FPGA-embedded security primitives or FPGA clocking resources are utilized.

Both the BulletProoF and SASB secure boot technique implement a PUF in the programmable logic (PL) side of an FPGA to generate the decryption key at boot-up time, and then uses the key for decrypting an off-chip NVM-stored second stage boot-up image, i.e., the encrypted bitstream. The second stage boot-up image contains PL components as well as software components such as an operating system and applications. The PL components are decrypted and programmed directly into those portions of the PL side that are not occupied by the system using dynamic partial reconfiguration while the software components are loaded into DRAM for access by the processor system (PS). The decryption key is destroyed once this process completes, minimizing the time the decryption key is available.

Similar to PUF-based authentication protocols, enrollment for the secure boot-up technique is carried out in a secure environment. The enrollment key generated is used to encrypt the second stage boot-up image. Both the encrypted image and the unencrypted bitstreams are stored in the NVM. During the in-field boot-up process, the first stage boot loader (FSBL) loads the unencrypted bitstream into the FPGA. The unencrypted bitstream is obtained from an external non-volatile memory (NVM). A hash of the unencrypted bitstream is computed. An encryption key is generated for a first time during enrollment. The encryption key is used to encrypt the computed hash of the unencrypted bitstream. The encrypted computed hash is appended to the unencrypted bitstream. The entire set of configuration data that has just been programmed into the FPGA is read using the internal configuration access port (ICAP) interface and this data is used as challenges to the PUF to regenerate the decryption key. Alternatively, the decryption key may be generated by measuring variations in path delays. Therefore, the secure boot technique self-authenticates. The bitstream instantiates the SHA-3 algorithm and uses this cryptographic function both to compute hashes and as the entropy source for the PUF. The generated decryption key is irreversibly tied to the data integrity of the entire unencrypted bitstream. The encrypted computed hash is decrypted using the decryption key to obtain a decrypted hash. This decrypted hash is compared to the computed has and the boot-up process continues if the decrypted hash matches the computed encrypted hash, or the boot-up process aborts deactivating the field programmable gate array (FPGA) if the decrypted hash does not match the computed encrypted hash.

Secure boot techniques are stored unencrypted in an off-chip NVM and is therefore vulnerable to manipulation by adversaries. However, the tamper-evident nature of the secure boot technique prevents the system from booting the components present in the second stage boot-up image if tamper occurs because an incorrect decryption key is generated. In such cases, the encrypted bit string is not decrypted and remains secure.

The hardware-embedded delay PUF (HELP) is leveraged as a component of the proposed tamper-evident, self-authenticating system implemented within system. HELP measures path delays through a CAD-tool synthesized functional unit, in particular the combinational component of SHA-3 in the system. Within-die variations that occur in path delays from one chip to another allow HELP to produce a device-specific key. Challenges for HELP are 2-vector sequences that are applied to the inputs of the combinational logic that implements the SHA-3 algorithm. The timing engine within HELP measures the propagation delays of paths sensitized by the challenges at the outputs of the SHA-3 combinational block. The digitized timing values are used in the HELP bitstring processing algorithm to generate the Advanced Encryption Standard (AES) algorithm key. The timing engine times paths using either the fine phase shift capabilities of the digital clock manager on the FPGA or by using an on-chip time-to-digital-converter (TDC) implemented using the carry-chain logic within the FPGA. The experimental results presented in this paper are based on the TDC strategy.

According to the secure boot technique according to the invention, the first stage boot loader (FSBL) programs the PL side of a FPGA with the unencrypted (and untrusted) bitstream, wherein the unencrypted bitstream is obtained from an external non-volatile memory (NVM).

A hash of the unencrypted bitstream is computed and an encryption key is generated for a first time during enrollment. The encryption key is used to encrypt the computed hash of the unencrypted bitstream. The encrypted computed hash is appended to the unencrypted bitstream.

Programmed data is then read from the FPGA. The configuration information of the PL side (including configuration data that describes itself) is read through the ICAP and computes a set of digests using SHA-3. For each digest, the mode of the SHA-3 functional unit is switched to PUF mode and the HELP engine is started. Each digest is applied to the SHA-3 combinational logic as a challenge. Signals propagate through SHA-3 to its outputs and are timed by the HELP timing engine. The timing values are stored in an on-chip BRAM. Once all timing values are collected, the HELP engine uses them (and Helper Data stored in the external NVM) to generate a device-specific decryption key. The key is used to decrypt the second stage boot-up image components also stored in the external NVM. Specifically, the encrypted computed hash is decrypted using the decryption key to obtain a decrypted hash. The computed hash is compared with the decrypted hash. The system continues to boot if the decrypted hash matches the computed encrypted hash, or the system is deactivated if the decrypted hash does not match the computed encrypted hash.

Self-authentication is ensured because any change to the configuration bitstream changes the digest. When the incorrect digest is applied as a challenge in PUF mode, the set of paths that are sensitized to the outputs of the SHA-3 combinational block change (when compared to those sensitized during enrollment using the trusted bitstream). Therefore, any change made by an adversary to the configuration bitstring results in missing or extra timing values in the set used to generate the decryption key.

The key generated by HELP is tied directly to the exact order and cardinality of the timing values. It follows that any change to the sequence of paths that are timed change the decryption key. As discussed further below, multiple bits within the decryption key change if any bit within the configuration bitstream is modified by an adversary because of the avalanche effect of SHA-3 and because of a permutation process used within HELP to process the timing values into a key. It should be noted that other components of the boot-up process, including the first stage boot loader (FSBL), may also be included in the secure hash process, as well as FPGA embedded security keys, as needed.

These and other exemplary features and advantages of the present invention will become clear from the following description with reference to the accompanying drawings.

BRIEF DESCRIPTION OF THE DRAWINGS

The following drawings form part of the specification and are included to further demonstrate certain embodiments or various aspects of the invention. In some instances, embodiments of the invention may be best understood by referring to the accompanying drawings in combination with the presented detailed description. The description and accompanying drawings may highlight a certain specific example, or a certain aspect of the invention. However, one skilled in the art will understand that portions of the example or aspect may be used in combination with other examples or aspects of the invention.

FIG. 8 illustrates a table of calibration data according to an embodiment of the invention.

DETAILED DESCRIPTION OF THE INVENTION

Figure 1:
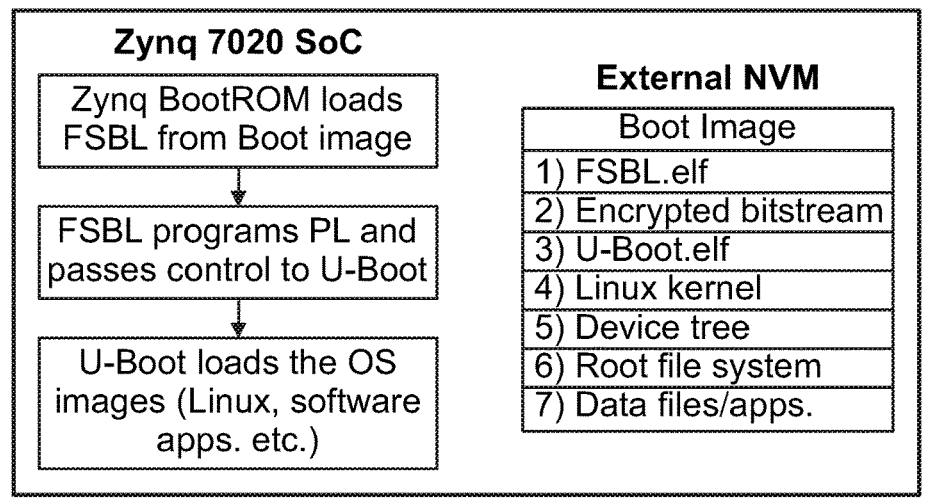
FIG. 1 illustrates a flow diagram of the current boot-up process of the Xilinx Zynq SoC.

The invention is directed to a system and methods that self-authenticates an unencrypted FPGA configuration bitstream loaded into the FPGA during the start-up. The internal configuration access port (ICAP) interface is accessed to read-out configuration information of the unencrypted bitstream, which is then used as input to SHA-3 to generate a digest.

More specifically, a PUF-based secure boot technique, i.e, the BulletProoF secure boot technique and SASB secure boot technique, self-authenticates as a mechanism to detect tamper. Enrollment for the secure boot-up technique is carried out in a secure environment. The enrollment key generated is used to encrypt the second stage boot-up image. Both the encrypted image and the unencrypted bitstreams are stored in the NVM. During the in-field boot-up process, the first stage boot loader (FSBL) loads the unencrypted bitstream into the FPGA. The unencrypted bitstream is obtained from an external non-volatile memory (NVM). A hash of the unencrypted bitstream is computed. An encryption key is generated for a first time during enrollment. The encryption key is used to encrypt the computed hash of the unencrypted bitstream. The encrypted computed hash is appended to the unencrypted bitstream. The entire set of configuration data that has just been programmed into the FPGA is read and used as challenges to the PUF to regenerate the decryption key. Alternatively, the decryption key may be generated by measuring variations in path delays. Therefore, the secure boot technique self-authenticates. The generated decryption key is irreversibly tied to the data integrity of the entire unencrypted bitstream. The encrypted computed hash is decrypted using the decryption key to obtain a decrypted hash. This decrypted hash is compared to the computed has and the boot-up process continues if the decrypted hash matches the computed encrypted hash, or the boot-up process aborts deactivating the field programmable gate array (FPGA) if the decrypted hash does not match the computed encrypted hash.

The self-authenticating processes detect tamper attacks that modify the LUTs or routing within the secure boot technique in an attempt to create a leakage channel for the key. The BulletProoF secure boot technique includes an embedded time-to-digital-converter, which is used by the HELP PUF to measure path delays and generate the encryption/decryption key.

An overview of the existing Xilinx FPGA boot-up process is now described. A Xilinx FPGA uses a hardwired 256-bit AES decryption engine to protect the confidentiality of externally stored bitstreams. The Xilinx FPGA provides software tools to allow a bitstream to be encrypted using either a randomly generated or user-specified key. Once generated, the decryption key may be loaded through JTAG—an industry standard for verifying designs and testing printed circuit boards after manufacture—into a dedicated E-Fuse NVM or battery-backed BRAM (BBRAM). The power-up configuration process associated with fielded systems first determines if the external bitstream includes an encrypted-bitstream indicator and, if so, decrypts the bitstream using cipher block chaining (CBC) mode of AES. To prevent fault injection attacks, the Xilinx FPGA authenticates configuration data as it is loaded. In particular, a 256-bit keyed hashed message authentication code (HMAC) of the bitstream is computed using SHA-256 to detect tamper and to authenticate the sender of the bitstream.

During provisioning, the Xilinx FPGA software is used to compute an HMAC of the unencrypted bitstream, which is then embedded in the bitstream itself and encrypted by AES. A second HMAC is computed in the field as the bitstream is decrypted and compared with the HMAC embedded in the decrypted bitstream. If the comparison fails, the FPGA is deactivated. The security properties associated with the Xilinx FPGA boot-up process enable the detection of transmission failures, attempts to program the FPGA with a non-authentic bitstream and tamper attacks on the authentic bitstream.

The secure boot-up model in modern Xilinx SoC architectures differs from that described above because Xilinx System-on-Chip's (SoCs) integrate both programmable logic (PL) and processor components (PS). Moreover, the SoC is designed to be processor-centric, i.e., the boot-up process and overall operation of the SoC is controlled by the processor. Xilinx SoCs use public key cryptography to carry out authentication during the secure boot-up process. The public key is stored in an NVM and is used to authenticate configuration files including the First Stage Boot Loader (FSBL) and therefore, it provides secondary authentication and primary attestation.

The invention is described with reference to a Xilinx Zynq 7020 SoC that incorporates both a processor (PS) side and programmable logic (PL) side. The processor side runs an operating system (OS), e.g., Linux, and applications on a dual core ARM cortex A-9 processor, which are tightly coupled with PL side through AMBA AXI interconnect.

As shown on the left side of FIG. 1, the basic elements of the Xilinx Zynq SoC secure boot-up process are identified. The Xilinx BootROM loads the FSBL from an external NVM to DRAM. The FSBL programs the PL side and then reads the second stage boot loader (U-Boot), which is copied to DRAM, and passes control to U-Boot. U-Boot loads the software images, which may include a bare-metal application or the Linux OS, and other embedded software applications and data files. Secure boot-up first establishes a root of trust, and then performs authentication on top of the trusted base at each of the subsequent stages of the boot-up process. Rivest-Shamir-Adleman (RSA) is used for authentication and attestation of the FSBL and other configuration files. The hardwired 256-bit AES engine and SHA-256 are then used to securely decrypt and authenticate boot-up images using a BBRAM or E-Fuse embedded key. Therefore, the root of trust and the entire secure boot-up process depends on the confidentiality of the embedded keys.

The secure boot technique according to the invention is designed to be self-contained, utilizing only components typically available in the FPGA PL fabric. Specialized, vendor-supplied embedded security components, including E-Fuse, BBRAM and cryptographic primitives such as AES are not used. The boot-up process according to the invention is illustrated in the flow diagram of FIG. 2. Similar to the Xilinx boot-up process, the BootROM loads the FSBL which then programs the PL side, in this case with the unencrypted bitstream. The FSBL then hands control over to BulletProoF, which carries out some of the functions normally delegated to U-Boot. The first task is to regenerate the decryption key by reading all of the configuration information programmed into the PL side using the ICAP interface. As configuration data is read, it is used as challenges to time paths between the ICAP and the SHA-3 functional unit (see FIG. 3C) and as input to the SHA-3 cryptographic hash function to compute a chained set of digests.

As configuration data is read and hashed, the BulletProoF secure boot technique periodically changes the mode of SHA-3 from hash mode to a specialized PUF mode of operation. PUF mode configures SHA-3 such that the combinational logic of SHA-3 is used as a source of entropy for key generation. The HELP PUF uses each digest as a challenge to the SHA-3 combinational logic block. HELP measures and digitizes the delays of paths sensitized by these challenges at high resolution and stores them in an on-chip BRAM for later processing. The same timing operation is carried out for paths between the ICAP and SHA-3 outputs, as discussed above, and the timing data combined and stored with the SHA-3 timing data in the BRAM. This process continues with additional configuration data added to the existing hash (chained) until all of the configuration data is read and processed.

Then, the externally stored Helper Data is read and delivered to the HELP algorithm as needed during the key generation process that follows. The decryption key is transferred to an embedded PL-side AES engine. According to the BulletProoF secure boot technique, the encrypted second stage boot-up image components are read (labels 3 through 9 in FIG. 2 from external NVM) and transferred to the AES engine.

An integrity check is performed at the beginning of the decryption process as a mechanism to determine if the proper key was regenerated. The first component decrypted is the key integrity check component (label 3 in FIG. 2). This component may be an arbitrary string or a secure hash of, e.g., U-Boot.elf, that is encrypted during enrollment and stored in the external NVM. An unencrypted version of the key integrity check component is also stored as a constant in the bitstream. The integrity of the decryption key is checked by comparing the decrypted version with the version according to the BulletProoF secure boot technique. If they match, then the integrity check passes and the boot-up process continues. Otherwise, the FPGA is deactivated and secure boot-up fails.

If the integrity check passes, the BulletProoF secure boot technique then decrypts and authenticates components (labels 4 through 9 in FIG. 2) using 256-bit AES in CBC mode and HMAC, respectively, starting with the application (App) bitstream. An application bitstream is programmed into the unused components of the PL side using dynamic partial reconfiguration. The software components are then decrypted, e.g., Linux, etc. and transfers them to U-Boot. The final step according to the BulletProoF secure boot technique is to boot strap the processor to start executing the Linux OS (or bare-metal application).

Figure 2:
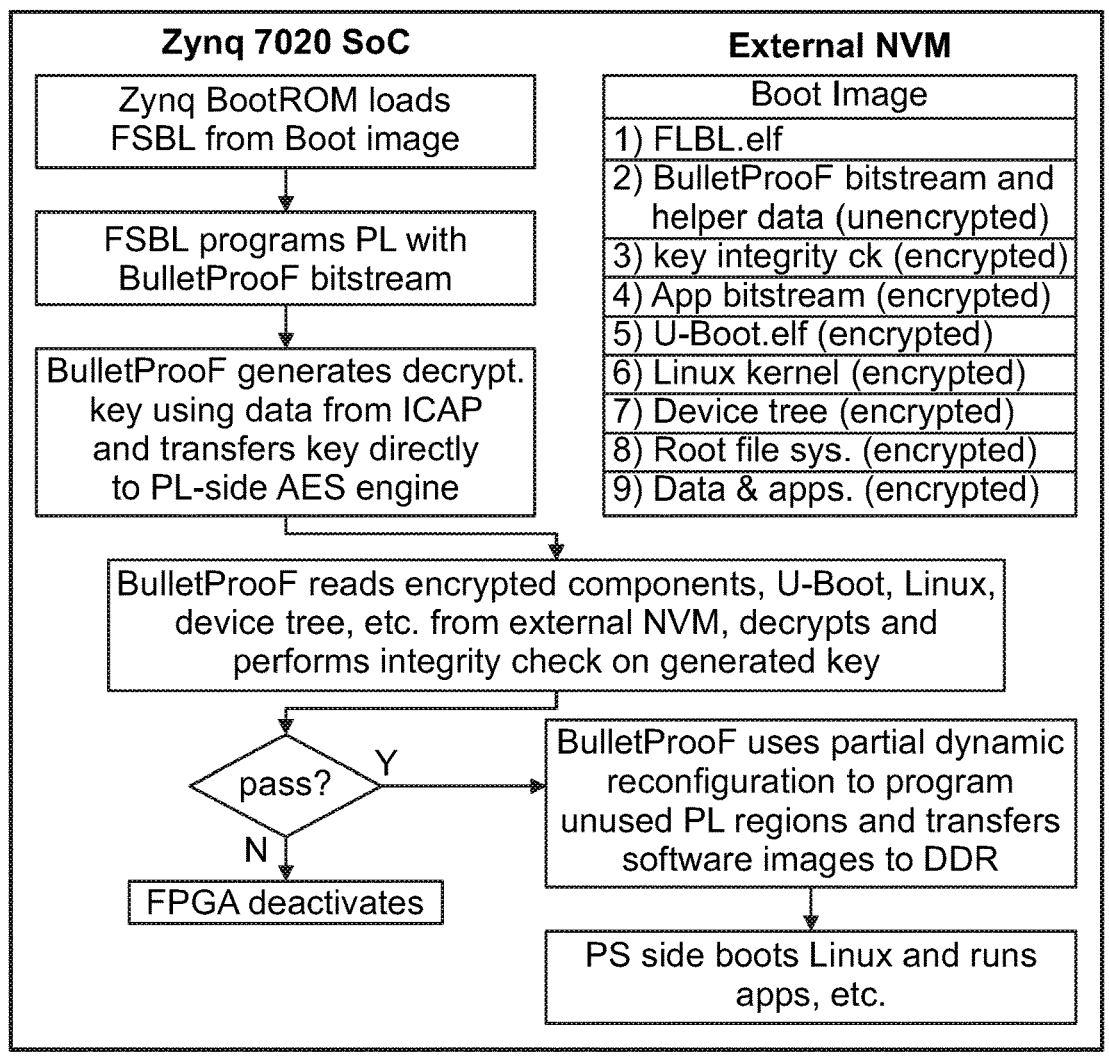
FIG. 2 illustrates a flow diagram of a method for the BulletProoF secure boot technique according to the invention.

According to the invention, a physical unclonable function (PUF) is used to generate the decryption key as a mechanism to eliminate the vulnerabilities associated with on-chip key storage. Key generation using PUFs requires an enrollment phase, which is carried out in a secure environment, i.e., before the system is deployed to the field. During enrollment when the key is generated for the first time, HELP generates the key internally and transfers Helper Data off of the FPGA. As shown in FIG. 2, the Helper Data is stored in the external NVM unencrypted. The internally generated key is then used to encrypt the other components of the external NVM (second stage boot-up image or SSBI) by configuring AES in encryption mode.

Figure 3A:
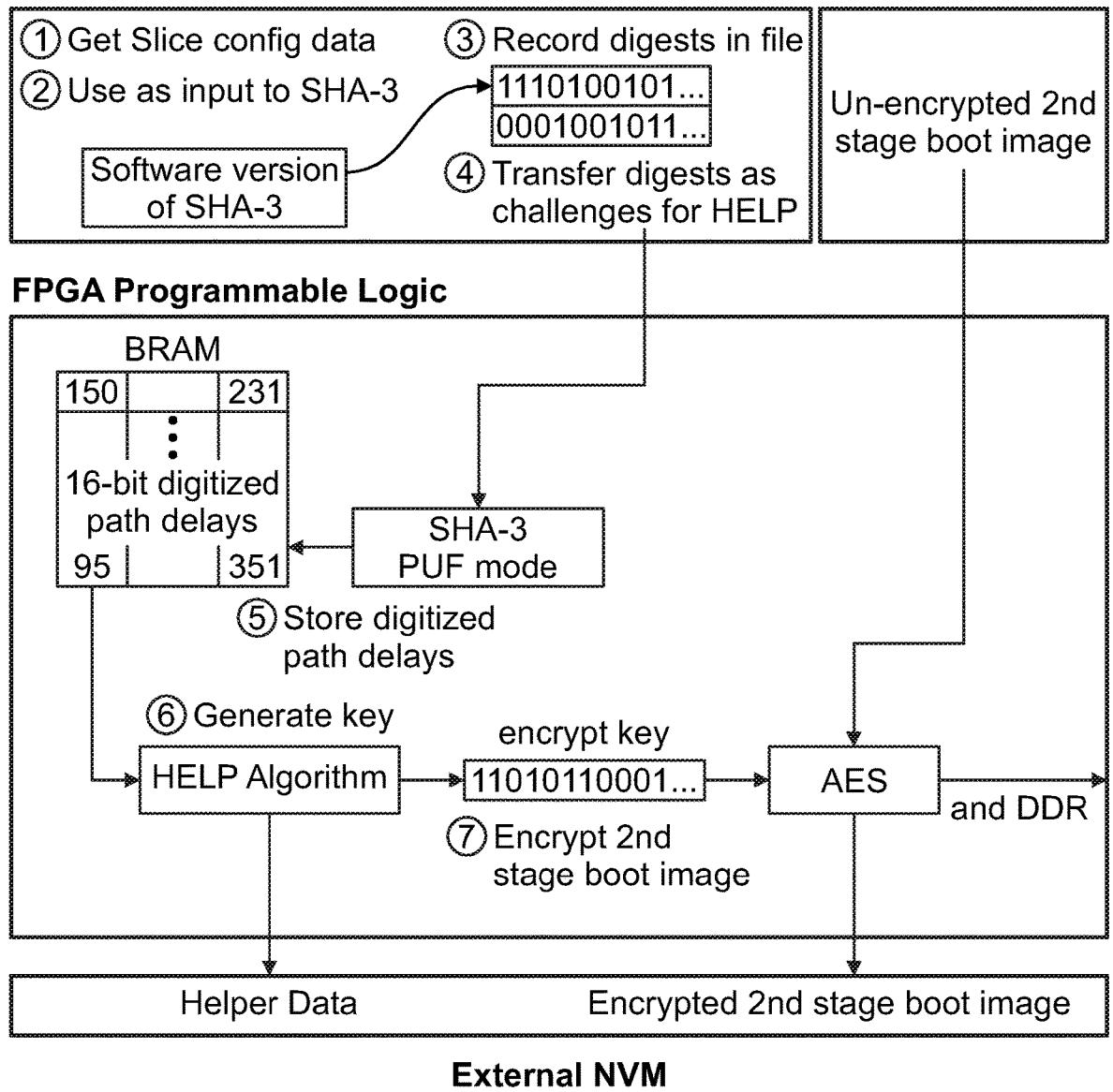
FIG. 3A illustrates a block diagram of the enrollment process for the BulletProoF secure boot technique according to one embodiment of the invention.

A special enrollment version of the BulletProoF secure boot technique is created to enable performance in a secure environment. FIG. 3A illustrates a block diagram of this enrollment process. The enrollment version is a stripped-down implementation of the fielded version performs and uses and encryption version of AES (instead of decryption as is true of fielded version). The following steps are highlighted in FIG. 3A. The FPGA slice configuration information is read out of an FPGA configured with the fielded version of the BulletProoF secure boot technique (or is processed directly from the unencrypted bitstream of the BulletProoF secure boot technique). The configuration information is partitioned and used as input to a software version of SHA-3. Each partition creates a SHA-3 digest, which is stored in a file. The digests are transferred into the FPGA to be used as challenges for HELP. These challenges are applied to the SHA-3 combinational block by HELP and the paths that are sensitized are timed. The digitized path delays are stored in an on-chip BRAM. The term 'PUF mode' refers to when SHA-3 is used as an Entropy source and the term 'functional mode' refers to when SHA-3 is used to compute digests. The digitized path delay values in the BRAM are processed by the HELP algorithm into an encryption key. The Helper data produced is stored in the External NVM of the fielded system. The unencrypted 2nd stage boot-up image is encrypted by AES and the encrypted image stored in External BRAM of the fielded system. It should be noted that the encryption key remains on the FPGA, i.e., it is never visible outside the chip even during enrollment.

Figure 3B:
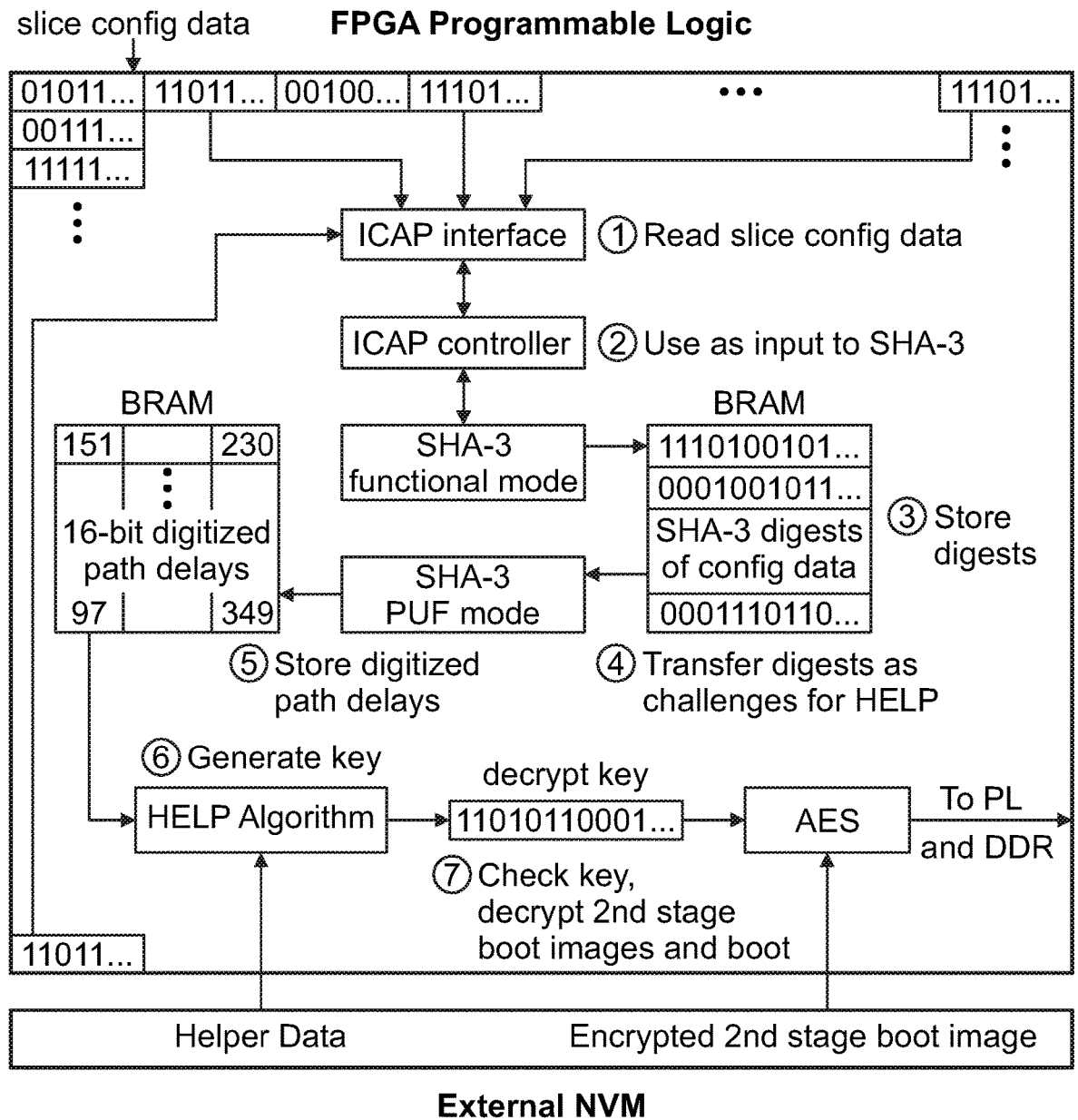
FIG. 3B illustrates a block diagram of the BulletProoF secure boot technique according to an embodiment of the invention.

FIG. 3B illustrates a block diagram of the BulletProoF secure boot technique according to an embodiment of the invention. As indicated above, the FSBL loads the unencrypted version of the BulletProoF secure boot technique from the external NVM into the PL portion of the FPGA and hands over control. As discussed further below, a ring-oscillator is utilized as a clock source that cannot be disabled during the boot-up process once it is started. This prevents attacks that attempt to stop the boot-up process at an arbitrary point to reprogram portions of the PL using external interfaces, e.g., PCAP, SelectMap and JTAG PCAP (attack scenarios are discussed subsequently).

The slice configuration information is read using the ICAP interface and controller. The configuration information is partitioned identically to enrollment and applied to SHA-3 to compute the digests. Note that SHA-3 is configured in 'functional mode' during this step. The digests are stored in an on-chip BRAM. The digests are used as challenges to the SHA-3 com-binational block with SHA-3 configured in PUF mode. The digitized timing values of sensitized paths are stored in a second on-chip BRAM. The HELP algorithm processes the digitized timing values and Helper data which is stored in an External NVM into a decryption key. An integrity check is run on the key and then the encrypted 2nd stage boot-up image is read from the external NVM. AES decrypts the image and transfers the software components into DDR and the hardware components into the unused portion of the PL using dynamic partial reconfiguration. Once completed, the system boots. It should be noted that the SHA-3 combinational logic block used in PUF mode is built as a 'hard-macro', and therefore has identical implementation characteristics (LUTs and routing) in both the enrollment and fielded versions of the BulletProoF secure boot technique.

Figure 3C:
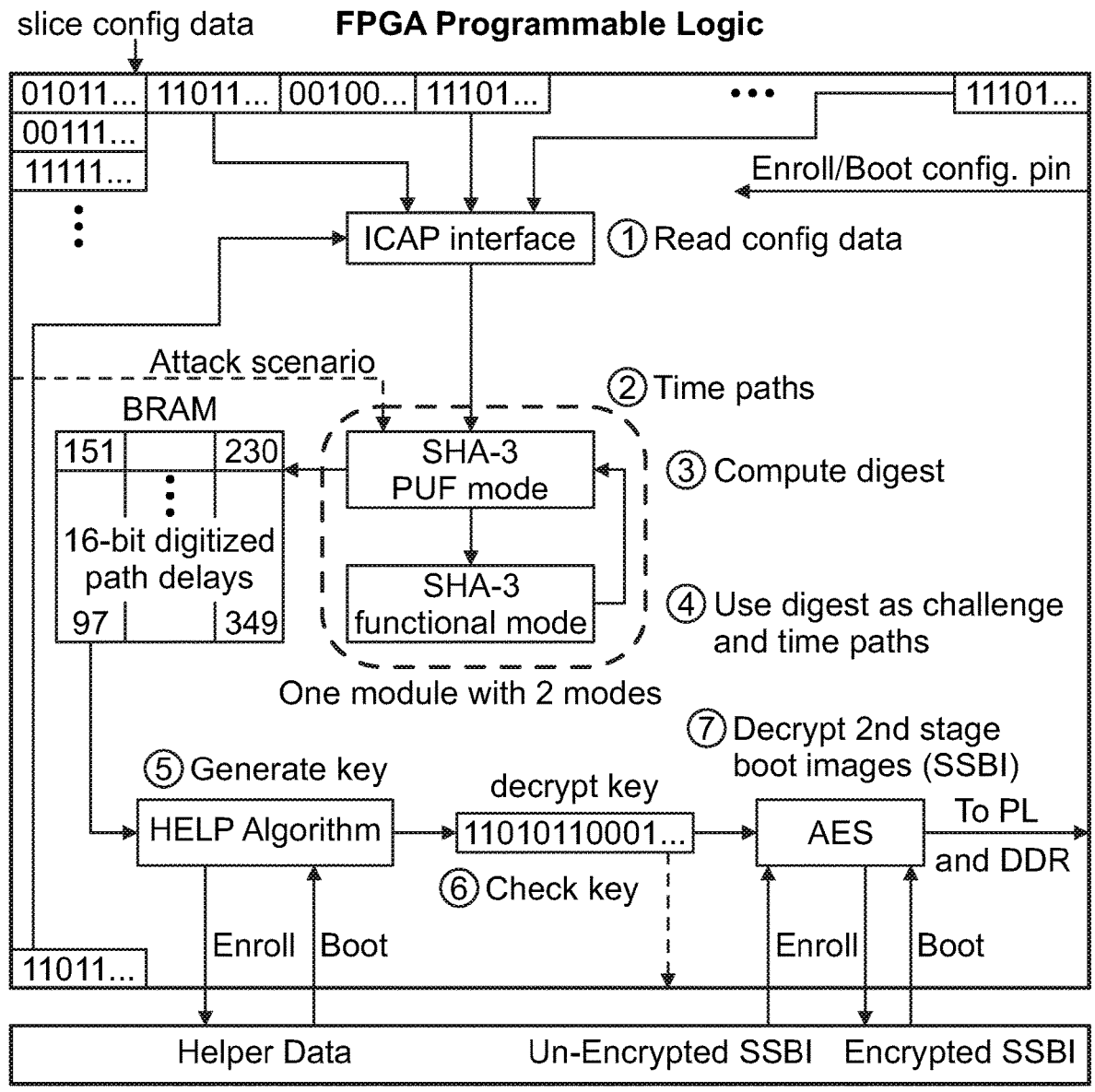
FIG. 3C illustrates a block diagram of the BulletProoF secure boot technique according to another embodiment of the invention.

FIG. 3C illustrates a block diagram of the BulletProoF secure boot technique according to another embodiment of the invention. In this embodiment, the BulletProoF secure boot technique uses a configuration I/O pin (or an E-Fuse bit) to determine whether it is operating in Enroll mode or Boot mode. The pin is labeled "Enroll/Boot config.pin" in FIG. 3C. The trusted party configures this pin to Enroll mode to process the "UnEncrypted SSBI" to an "Encrypted SSBI", and to create the Helper Data. The Encrypted SSBI and Helper Data are stored in an External NVM and later used by the fielded version to boot (see 'Enroll' annotations along bottom of FIG. 3C). Therefore, the Enroll and Boot versions are identical. Note that the "Enroll/Boot config.pin" allows the adversary through board-level modifications to create new versions of the Encrypted SSBI while preserving to protect the confidentiality and integrity of the trusted authority's second stage boot-up image.

As shown in FIG. 3C, the FSBL loads the unencrypted version of the BulletProoF secure boot technique from the external NVM into the PL of the FPGA and hands over control. As discussed further below, a ring-oscillator is used as a clock source that cannot be disabled during the boot-up process once it is started. This prevents attacks that attempt to stop the boot-up process at an arbitrary point to reprogram portions of the PL using external interfaces, e.g., PCAP, SelectMap or JTAG.

As shown in FIG. 3C, and similar to that described in FIG. 3B, configuration data is read using the ICAP interface using a customized controller. Every n-th configuration word is used as a challenge to time paths between the ICAP and the SHA-3 outputs with SHA-3 configured in PUF mode, which is done to prevent a specific type of reverse-engineering attach discussed below. The digitized timing values are stored in an on-chip BRAM. The remaining configuration words are applied to the inputs of SHA-3 in functional mode to compute a chained sequence of digests. Periodically, the existing state of the hash is used as a challenge with SHA-3 configured in PUF mode to generate additional timing data. The digitized timing values are stored in an on-chip BRAM. Once all configuration data is processed, the HELP algorithm processes the digitized timing values into a decryption key using Helper Data which are stored in an External NVM. An integrity check is run on the key. The encrypted 2nd stage boot-up image (SSBI) is read from the external NVM. AES decrypts the image and transfers the software components to U-Boot (versus DDR described in FIG. 3B) and the hardware components into the unused portion of the PL using dynamic partial reconfiguration. Once completed, the system boots.

The BulletProoF secure boot technique according to the invention protects the second stage boot-up images, i.e., prevent them from being decrypted, changed, encrypted and installed back into the fielded system. In order to do so, the following security properties are supported by the invention.

The enrollment and regeneration process never reveals the key outside the FPGA. Therefore, physical, side-channel-based attacks are necessary in order to steal the key. It is contemplated that the AES engine may be designed with side-channel attack resistance using circuit countermeasures.

Any type of tamper with the unencrypted bitstream or Helper Data by an adversary only prevents the key from being regenerated and a subsequent failure of boot-up process. However, it is always possible to attack a system in this fashion, i.e., by tampering with the contents stored in the external NVM, independent of whether it is encrypted or not.

Any attempt to reverse engineer the unencrypted bitstream in an attempt to insert logic between the ICAP and SHA-3 input changes the timing characteristics of these paths, resulting in key regeneration failure. For example, the adversary may attempt to rewire the input to SHA-3 to allow external configuration data (constructed to exactly model the data that exists in the trusted version) to be used instead of the ICAP data.

Another security property is that the PUF used by the BulletProoF secure boot technique uses a helper data scheme that does not leak information about the key. This prevents an adversary from reverse-engineering the Helper Data to derive the secret key.

Since the BulletProoF secure boot technique stores an unencrypted version of the bitstream, adversaries are free to change components and/or add additional functionality to the unused regions in the PL. As indicated, changes to configuration data read from ICAP are detected because the paths that are timed by the modified configuration data are different, which causes key regeneration failure.

Using a ring oscillator as a clock source prevents the BulletProoF secure boot technique form being stopped by the adversary as a mechanism to steal the key (discussed further below).

The BulletProoF secure boot technique disables the external programming interfaces (PCAP, SelectMap and JTAG) prior to starting to prevent adversaries from attempting to perform dynamic partial reconfiguration during the boot-up process. The state of these external interfaces are actively monitored during boot-up, and destroys the timing data and/or key if any changes are detected.

Lastly, the BulletProoF secure boot technique erases the timing data from the BRAM once the key is generated, and destroys the key once the 2nd stage boot-up image is decrypted. The key is also destroyed if the key integrity check fails.

These security properties of the invention protect the second stage boot-up images from being decrypted, changed, encrypted and installed back into the fielded system.

The primary threat to the BulletProoF secure boot technique is key theft. Following are two important attack scenarios and a data spoofing countermeasure and a clock manipulation countermeasure designed to deal with these attacks.

The first important attack scenario is shown by the thick dotted lines in FIG. 3C. The top left thick dotted line labeled 'Attack scenario' represents an adversarial modification which is designed to re-route the origin of the configuration data from the ICAP to I/O pins. With this change, the adversary may stream in the expected configuration data and then freely modify any portion of the BulletProoF configuration. The simplest change that may be made is to add a key leakage channel as shown by the thick dotted line along the bottom of the FIG. 3C.

Figure 4:
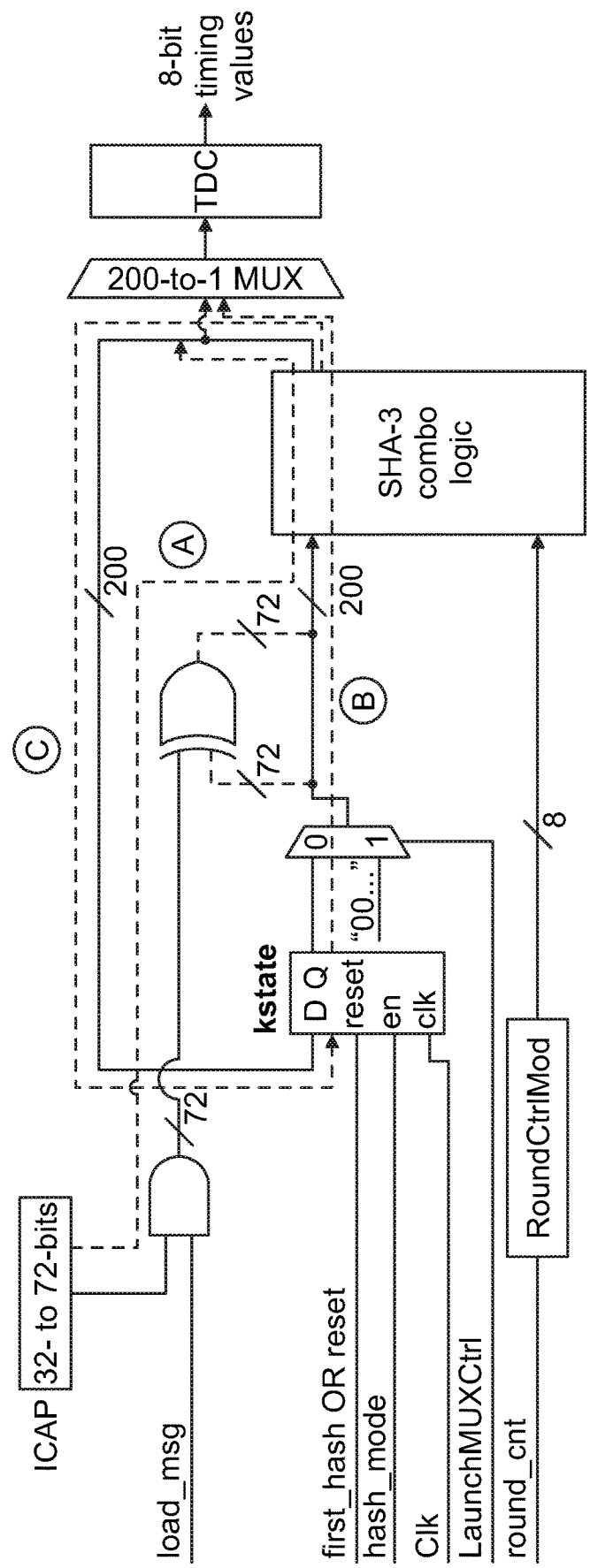
FIG. 4 illustrates a block diagram of architecture that prevents an adversary from making changes to the paths between the ICAP and the SHA-3 without changing the timing data and decryption key according to the invention.

The data spoofing countermeasure to this attack ensures the adversary is not able to make changes to the paths between the ICAP and the SHA-3 without changing the timing data and decryption key. A block diagram of the architecture that addresses this threat is shown in FIG. 4. In particular, timing data is collected by timing the paths identified as "A" and "B". For "A", the 2 vector sequence (challenge) $V_1$-$V_2$ is derived directly from the ICAP data. In other words, the launch of transitions along the "A" paths is accomplished within the ICAP interface itself. Signal transitions emerging on the ICAP output register propagate through the SHA-3 combinational logic to the time-to-digital converter or TDC shown on the right (discussed below).

The timing operation is carried out by de-asserting hash_mode and then launching V2 by asserting ICAP control signals using the ICAP input register (not shown). The path selected by the 200-to-1 MUX is timed by the TDC. This operation is repeated to enable all of the 72 individual paths along the "A" route to be timed. It should be noted that the ICAP output register is only 32-bits, which is fanned-out to 72-bits. The timing operation involving the 'chained' sequence of hashes times paths along the routes labeled by "B" in FIG. 4. The current state of the hash is maintained in kstate when hash_mode is deasserted by virtue of disabling updates to the FFs using the en input. Vector $V_1$ of the two-vector sequence is all 0's and the launch of $V_2$ is accomplished by deasserting LaunchMUXCtrl.

Hash mode of operation, labeled "C" in FIG. 4, is enabled by asserting hash_mode. Configuration data is hashed into the current state by asserting load_msg on the first cycle of the SHA-3 hash operation. LaunchMUXCtrl remains deasserted in hash mode.

The second important attach scenario may occur when the adversary attempts to stop the BulletProoF secure boot technique during key generation or after the key is generated, reprogram portions of the PL and, e.g., create a leakage channel that provides direct access to the key. The clock source and other inputs to the Xilinx digital clock manager (DCM), including the fine phase shift functions used by HELP to time paths, therefore represent an additional vulnerability.

A clock manipulation countermeasure that addresses clock manipulation attacks uses a ring oscillator (RO) to generate the clock and a time-to-digital-converter (TDC) as an alternative path timing method that replaces the Xilinx DCM. The RO and TDC are implemented in the programmable logic and therefore the configuration information associated with them is also processed and validated by the hash-based self-authentication mechanism described above.

Figure 5:
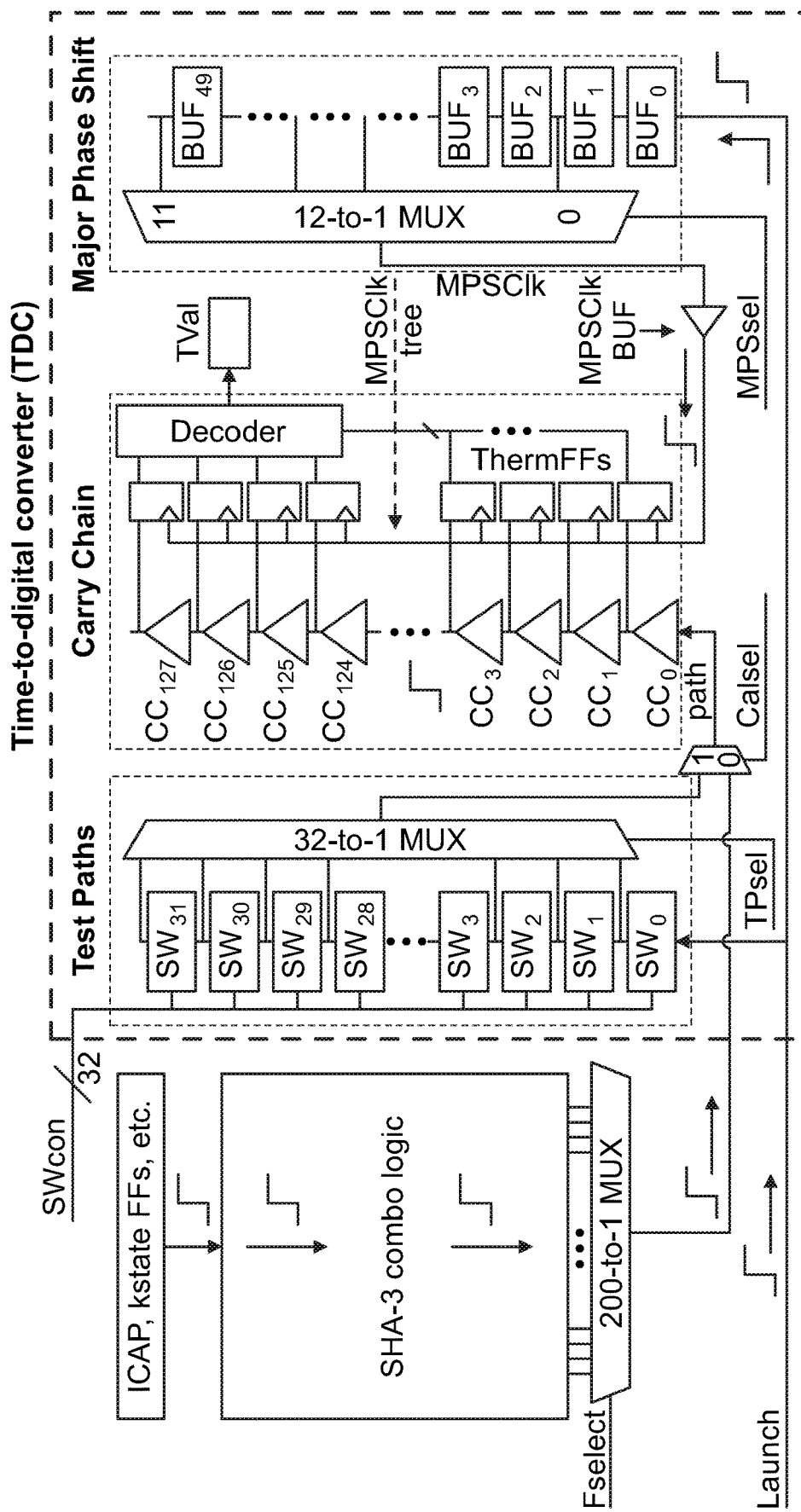
FIG. 5 illustrates a block diagram of time-to-digital (TDC) converter architecture according to the invention.

As discussed previously, HELP measures path delays in the combinational logic of the SHA-3 hardware instance. FIG. 5 illustrates a block diagram of time-to-digital (TDC) converter architecture according to the invention. The left side of the block diagram in FIG. 5 shows an instance of SHA-3 configured with components described in FIG. 4. The right side shows an embedded time-to-digital converter (TDC) engine, with components labeled Test Paths, Carry Chain and Major Phase Shift which are used to obtain high resolution measurements of the SHA-3 path delays.

Figure 6:
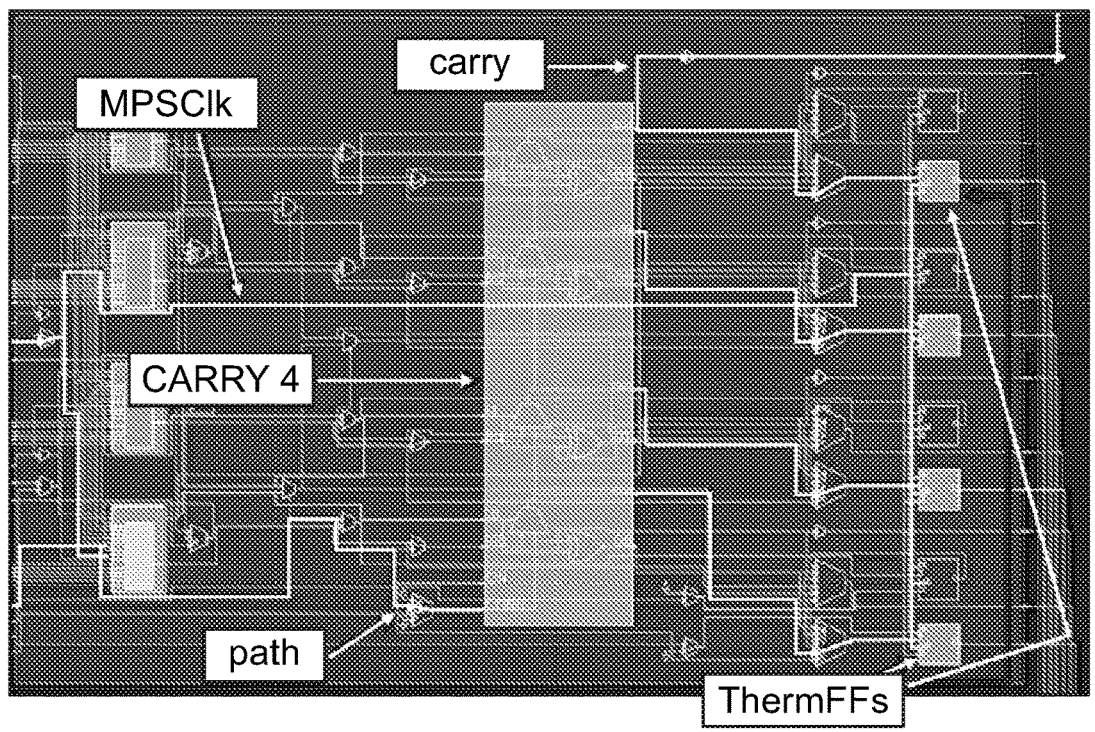
FIG. 6 illustrates an implementation view diagram of a Xilinx FPGA according to the invention.

FIG. 6 illustrates an implementation view diagram of a Xilinx FPGA according to the invention. As highlighted in FIG. 6, Carry Chain (CARRY4) components within the FPGA are leveraged within the TDC. A CARRY4 element is a sequence of 4 high-speed hardwired buffers, with outputs connected to a set of 4 FFs labeled ThermFFs in FIG. 5 and FIG. 6. The Carry Chain component in FIG. 5 is implemented by connecting a sequence of 32 CARRY4 primitives in series, with individual elements labeled as $CC_0$ to $CC_{127}$ in FIG. 5. Therefore, the Carry Chain component implements a delay chain with 128 stages. The path to be timed (labeled "path" in FIG. 5 and FIG. 6) drives the bottom-most $CC_0$ element of the. Transitions on this path propagate upwards at high speed along the chain where each element of the carry chain adds approx. 15 ps of buffer delay. As the signal propagates, the Decoder inputs of the ThermFFs change from 0 to 1, one-by-one, over the length of the chain. The ThermFFs are configured as positive-edge-triggered FFs and therefore, they sample the D input when their Clk input is 0. The Clk input to the ThermFFs is driven by a special Major Phase Shift Clk (MPSClk) that is described further below.

Figure 7:
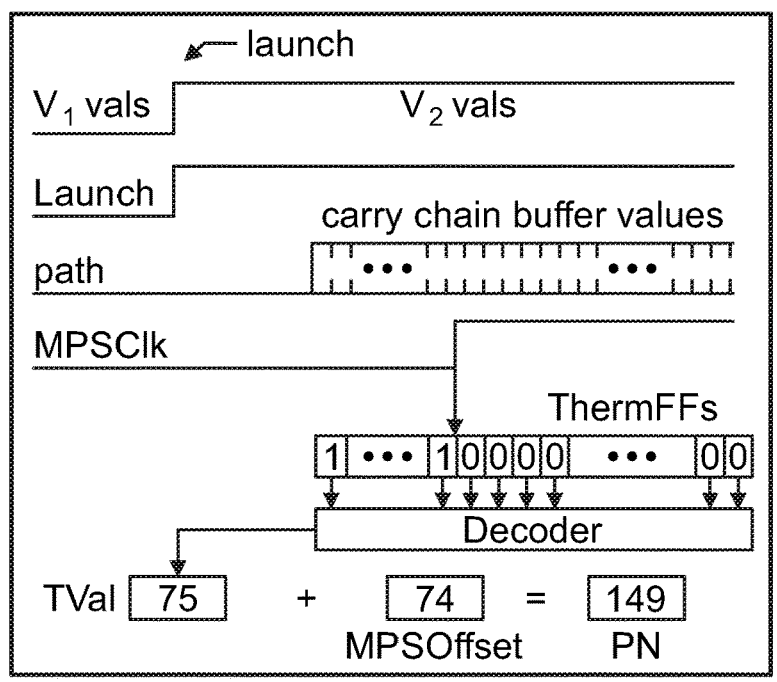
FIG. 7 illustrates a timing diagram for the timing engine according to the invention.

The delay of a path through the SHA-3 combinational logic block is measured as follows. First, the MPSClk signal at the beginning of the path delay test is set to 0 to make the ThermFFs sensitive to the delay chain buffer values. The path to be timed is selected using 'Fselect' and is forced to 0 under the first vector, $V_1$, of the 2-vector sequence. Therefore, the signal path and the delay chain buffers are initialized to 0, as illustrated on the left side of the timing diagram in FIG. 7. The launch event is initiated by applying $V_2$ to the inputs of SHA-3 while simultaneously asserting the 'Launch' signal, which creates rising transitions that propagate as shown by the arrows on the left side of FIG. 5. The 'Launch' signal propagates into the MPS BUF, delay chain shown on the right side of FIG. 5 simultaneous with the 'path' signal's propagation through SHA-3 and the carry chain. The 'Launch' signal eventually emerges from the Major Phase Shift unit on the right as MPSClk. It should be noted that to minimize Clk skew, the MPSClk signal drives a Xilinx BUFG primitive and a corresponding clock tree on the FPGA.

When MPSClk goes high, the ThermFFs store a snap-shot of the current state of carry chain buffer values. Assuming this event occurs as the rising transition on path is still propagating along the carry chain, the lower set of ThermFFs store 1's while the upper set store 0's (see timing diagram in FIG. 7). The sequence of 1's followed by 0's is referred to as a thermometer code or TC. The Decoder component in FIG. 5 counts the number of 0's in the 128 ThermFFs and stores this count in the TVal (timing value) register. The TVal is added to an MPSOffset (discussed below) to produce a PUF Number (PN), which is stored in BRAM for use in the key generation process.

The differences in the relative delays of the path and MPSClk signals may cause an underflow or overflow error condition, which is signified when the TVal is either 0 or 128. Although the carry chain may be extended in length as a means of avoiding these error conditions, it is not practical to do so. This is true because of very short propagation delay associated with each carry chain element (approx. 15 ps) and the wide range of delays that need to be measured through the SHA-3 combinational logic (approx. 10 ns), which requires the carry chain to be more than 650 elements in length.

In modern FPGAs, a carry chain of 128 elements is trivially mapped into a small region of the programmable logic. The shorter length also minimizes adverse effects created by across-chip process variations, localized temperature variations and power supply noise. However, the shorter chain does not accommodate the wide range of delays that need to be measured, and instances of underflow and overflow become common events.

The Major Phase Shift (MPS) component is included as a means of dealing with underflow and overflow conditions. Its primary function is to extend the range of the paths that may be timed. With 128 carry chain elements, the range of path delays that may be measured is approx. 128*15 ps which is less than 2 ns. The control inputs to the MPS, labeled MPSsel in FIG. 5, allow the phase of MPSClk to be adjusted to accommodate the 10 ns range associated with the SHA-3 path delays. However, a calibration process needs to be carried out at start-up to allow continuity to be maintained across the range of delays to be measured.

The MPS component and calibration are designed to expand the measurement range of the TDC while minimizing inaccuracies introduced as the configuration of the MPS is tuned to accommodate the length of the path being timed. From FIG. 5, the MPSClk drives the ThermFF Clk inputs and therefore controls how long the ThermFFs continue to sample the $CC_x$ elements. The 12-to-1 MUX associated with the MPS may be controlled using the MPSsel (the control inputs to the MPS) signals to delay the Clk with respect to the path signal. The MPS MUX connects to the BUFx chain at 12 different tap points, with 0 selecting the tap point closest to the origin of the BUF path along the bottom and 11 selecting the longest path through the BUFx chain. The delay associated with MPSsel set to 0 is designed to be less than delay of the shortest path through the SHA-3 combinational logic.

An underflow condition occurs when the path transition arrives at the input of the carry chain (at $CC_0$) after the MPSClk is asserted on the ThermFFs. The MPS controller configures the MPSsel to 0 initially, and increments this control signal until underflow no longer occurs. This requires the path to be retested at most 12 times, once of each MPSsel setting. Note that paths timed with MPSsel>0 require the additional delay along the MPS BUFx chain, called an MPSOffset, to be added to the TVal. Calibration is a process that determines the MPSOffset values associated with each MPSsel>0.

The goal of calibration is to measure the delay through the MPS BUFx chain between each of the tap points associated with the 12-to-1 MUX. In order to accomplish this, during calibration, the role of the path and MPSClk signals are reversed. In other words, the path signal is now the 'control' signal and the MPSClk signal is timed. The delay of the path signal needs to be controlled in a systematic fashion to create the data required to compute an accurate set of MPSOffset values associated with each MPSsel setting.

The calibration process utilizes the Test Path component from FIG. 5 to allow systematic control over the path delays. During calibration, the input of the carry chain is redirected from SHA-3 to the Test Path output. The TPsel control signals of the Test Path component allow paths of incrementally longer lengths to be selected during calibration, from 1 LUT to 32 LUTs. Although paths within the SHA-3 combo logic unit may be used for this purpose, the Test Path component allows a higher degree of control over the length of the path. The components labeled $SW_0$ through $SW_{31}$ refer to a 'switch', which is implemented as 2 parallel 2-to-1 MUXs (similar to the Arbiter PUF but with no constraints on matching delays along the two paths). The rising transition entering the chain of switches at the bottom is fanned-out and propagates along two paths. Each SW may be configured with a SWcon signal to either route the two paths straight through both MUXs (SWcon='0') or the paths may be swapped (SWcon='1'). The configurability of the Test Path component provides a larger variety of path lengths that calibration may use, and therefore, improves the accuracy of the computed MPSOffsets.

The tap points in the MPS component are selected such that any path within the Test Path component may be timed without underflow or overflow by at least two consecutive MPSsel control settings. If this condition is met, then calibration may be performed by selecting successively longer paths in the Test Path component and timing each of them under two (or more) MPSsel settings. By holding the selected test path constant and varying the MPSsel setting, the computed TVals represents the delay along the BUFx chain within the MPS between two consecutive tap points.

FIG. 8 illustrates a table of calibration data and shows a subset of the results of applying calibration to a Xilinx Zynq 7020 FPGA. The left-most column identifies the MPSsel setting (labeled MPS). The rows labeled with a number in the MPS column give the TVals obtained for each of the test paths (TP) 0-31 under a set of SWcon configurations 0-7. SWcon configurations are randomly selected 32-bit values that control the state of Test Path switches from FIG. 5. Calibration was carried out with 8 different SWcon vectors as a means of obtaining sufficient data to compute the set of 7 MPSOffsets accurately.

TVals of 0 and 128 indicate underflow and overflow, respectively. The rows labeled Diffs are differences computed using the pair of TVals shown directly above the Diffs values in each column. Note that if either TVal of a pair is 0 or 128, the difference is not computed, and is signified using 'NA' in the table. Only the data and differences for MPS 0 and 1 (rows 3-5) and MPS 1 and 2 (rows 6-8) are shown from the larger set generated by calibration. As an example, the TVals in rows 3 and 4, column 2 are 91 and 17 respectively, which represents the shortest test path 0 delay under MPSsel setting 0 and 1, respectively. Row 5 gives the difference as 74. The Diffs in a given row are expected to be same because the same two MPSse values are used. Variations in the Diffs occur because of measurement noise and within-die variations along the carry chain, but are generally very small, e.g., 2 or smaller as shown for the data in the table.

The Average at column 5 gives the average values of the Diffs across each row using data collected from 8 SWcon configurations. The MPSOffset at column 6 is simply computed as a running sum of the Ave column values from top to bottom. Once calibration data is available and the MPSOffset values computed, delays of paths within the SHA-3 are measured by setting MPSsel to 0 and then carrying out a timing test. If the TVal is 128 (all 0's in the carry chain) then the MPSClk arrived at the ThermFFs before the transition on the functional unit path arrived at the carry chain input. In this case, the MPSsel value is incremented and the test is repeated until the TVal is non-zero. The MPSOffset associated with the first test of a path that produces a valid TVal is added to the TVal to produce the final PN value (see FIG. 7).

The HELP PUF within the BulletProoF secure boot technique must be able to regenerate the decryption key without bit-flip errors and without any type of interaction with a server. Hence, a bit-flip error avoidance scheme is proposed that creates three copies of the key and uses majority voting to eliminate inconsistencies that occur in one of the copies at each bit position. The scheme is identical to traditional triple-modular-redundancy (TMR) methods used in fault tolerance designs. This technique is here extended to allow additional copies, e.g., 5MR, 7MR, 9MR, etc., and combine it with a second reliability-enhancing method, called Margining. The combined method is referred to as secure-key-encoding or SKE because the Helper Data does not leak any information about the secret key. The Helper Data generated during enrollment is stored in an NVM and is read in during the key regeneration process as discussed in reference to FIG. 3.

The Margin method creates weak bit regions to identify PUF Numbers (PN from FIG. 7) that have a high probability of generating bit-flip errors. These PN are considered unstable and their corresponding bits as weak. A Helper Data bitstring is generated during enrollment that records the positions of the unstable PN in the sequence that is processed. Helper Data bits that are 0 inform the enrollment and regeneration key generation process to skip over these PN. On the other hand, the PN classified as stable are processed into key bits, and are called strong bits. The SKE enrollment process constructs an odd number of strong bit sequences, where each sequence is generated from independent PN but are otherwise identical (redundant) copies of each other. During regeneration, the same sequences are again constructed possibly with bit-flip errors. Majority voting is used to avoid bit-flip errors in the final decryption key by ignoring errors in 1 of the 3 copies (or 2 of the 5 copies, etc.) that are inconsistent with the bit value associated with the majority. The number of copies is referred to as the redundancy setting and is given as 3, 5, 7, etc. It should be noted that HELP processes a set of 4096 PN into a multi-bit key in contrast to other PUFs which generate key bits one-at-a-time. HELP also includes several other parameters beyond the Margin and the number of redundant copies used in the majority voting scheme. For example, HELP allows the user to specify a pair of LFSR seeds that are then used to pseudo-randomly pair the 4096 PN to create 2048 PN differences. HELP also defines a third reliability-enhancing technique that is based on applying linear transformations to the 2048 PN differences, and a modulus operation designed to remove path-length bias effects. The decryption key produced by HELP is dependent on the values assigned to these parameters. It follows then that a comprehensive evaluation of bitstring statistical quality requires the analysis to be performed under different parameter combinations.

A statistical analysis of bitstrings generated by the TDC is provided as proof-of-concept. The statistical results investigate one set of challenges, two Margins of 3 and 4, and nine Moduli between 14 and 30. The statistics are averaged across 400 groups of 2048 PN difference created using different LFSR seed pairs. Although this represents only a small portion of the total challenge-response space of HELP, it is sufficiently diverse to provide a good model of the expected behavior under different challenge sets and parameter combinations.

Unlike previously reported statistics on the HELP PUF, the results shown here are generated using the TDC described with respect to the clock manipulation countermeasure. The three standard statistical quality metrics evaluated include uniqueness (using inter-chip hamming distance), reliability (using intra-chip hamming distance) and randomness (using the NIST statistical test suite). The analysis is carried out using data collected from a set of 30 Xilinx Zynq 7020 chips (on Zedboards). The data is collected under enrollment conditions at 25° C., 1.00V and over a set of 15 temperature-voltage (TV) corners represented by all combinations of temperatures (−40° C., 0° C., 25° C., 85° C., 100° C.) and voltages (0.95V, 1.00V and 1.05V).

Figure 9A:
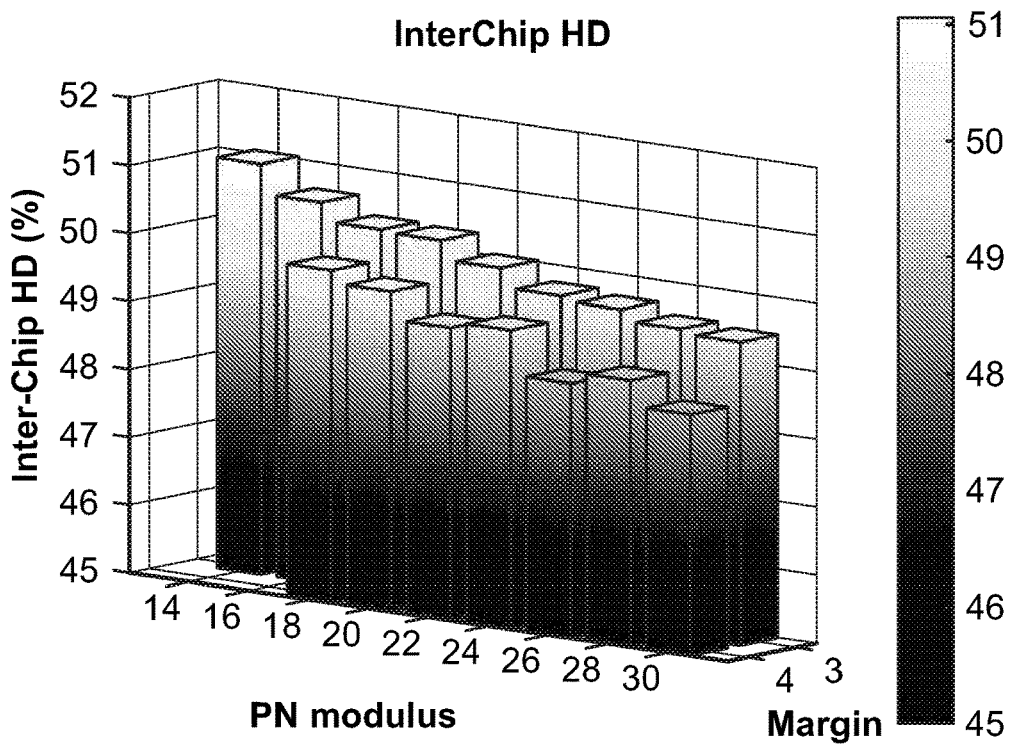
FIG. 9A illustrates a bar graph representing the statistical results for InterChip hamming distance (HD) according to one embodiment of the invention.
Figure 9B:
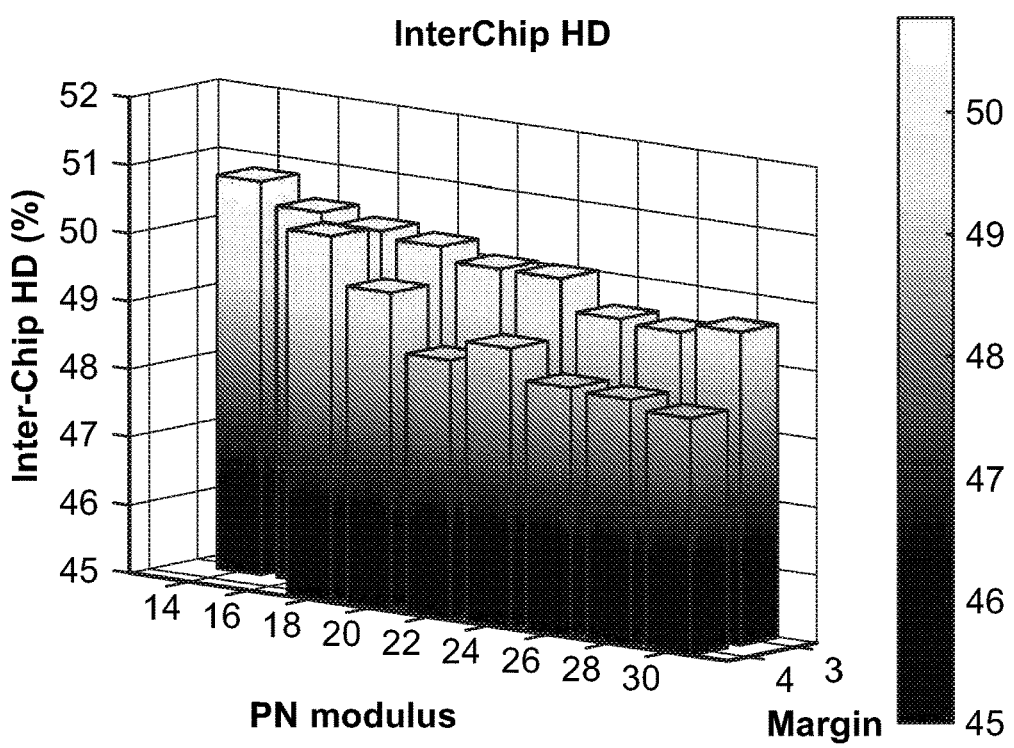
FIG. 9B illustrates a bar graph representing the statistical results for InterChip hamming distance (HD) according to another embodiment of the invention.
Figure 9C:
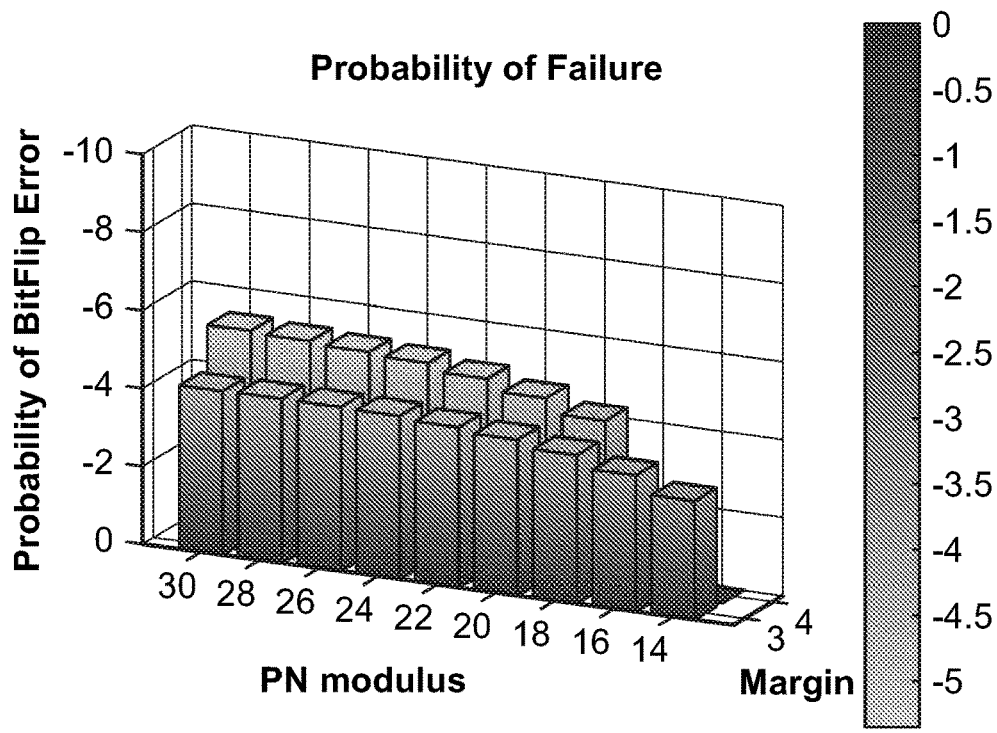
FIG. 9C illustrates a bar graph representing the statistical results for Probability of Failure according to one embodiment of the invention.
Figure 9D:
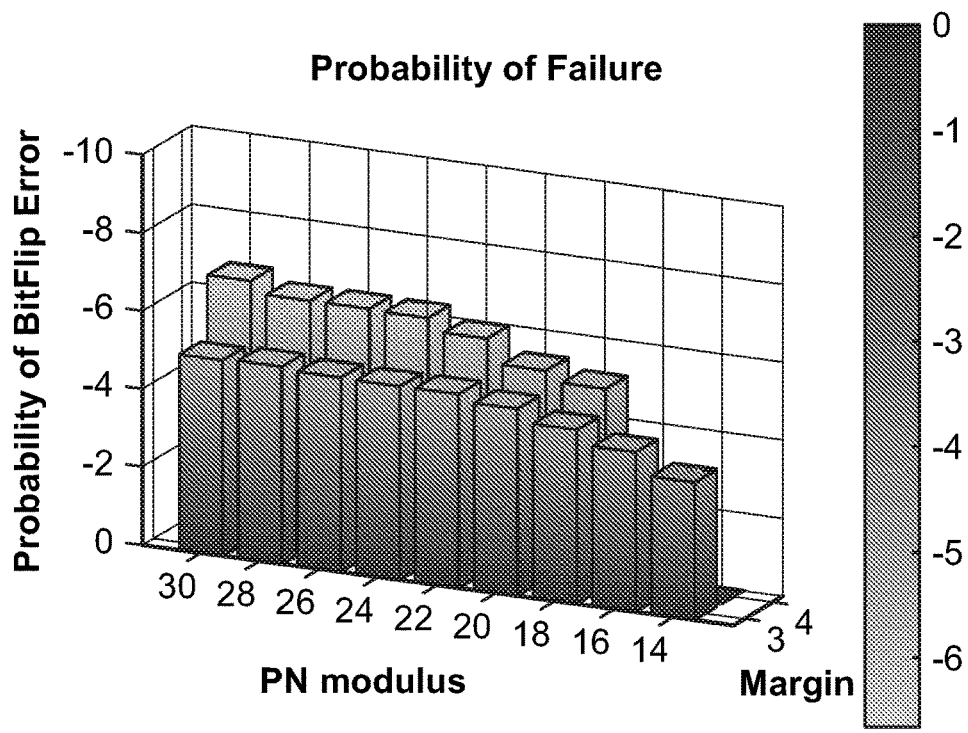
FIG. 9D illustrates a bar graph representing the statistical results for Probability of Failure according to another embodiment of the invention.
Figure 9E:
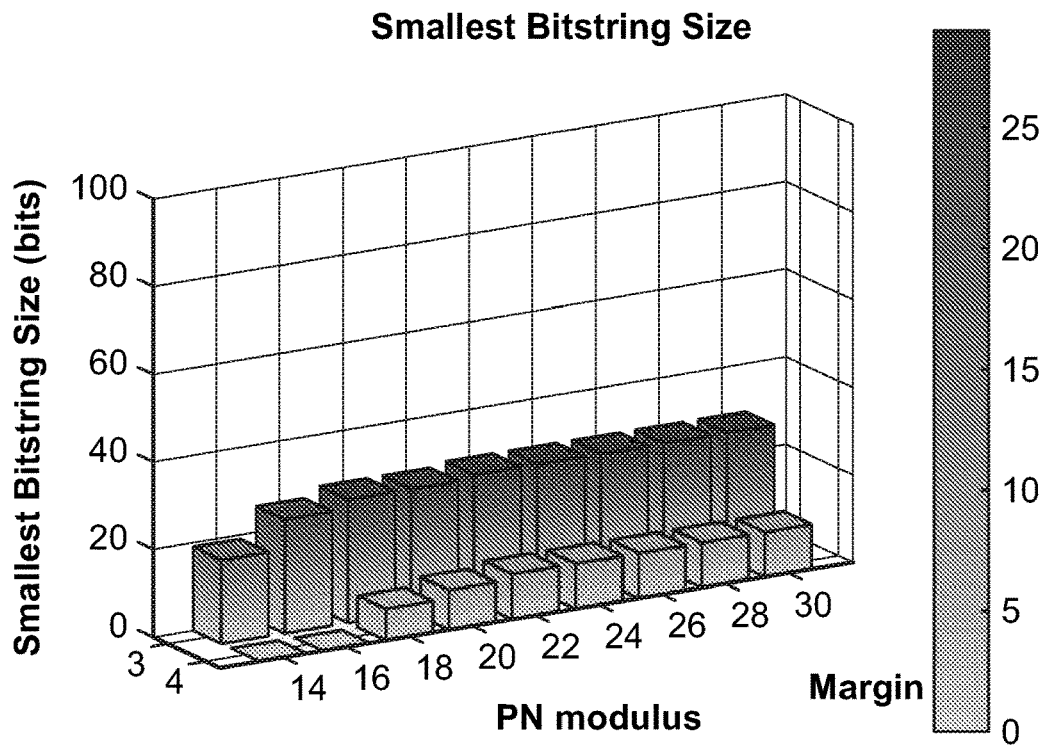
FIG. 9E illustrates a bar graph representing the statistical results for Smallest Bitstring Size according to one embodiment of the invention.
Figure 9F:
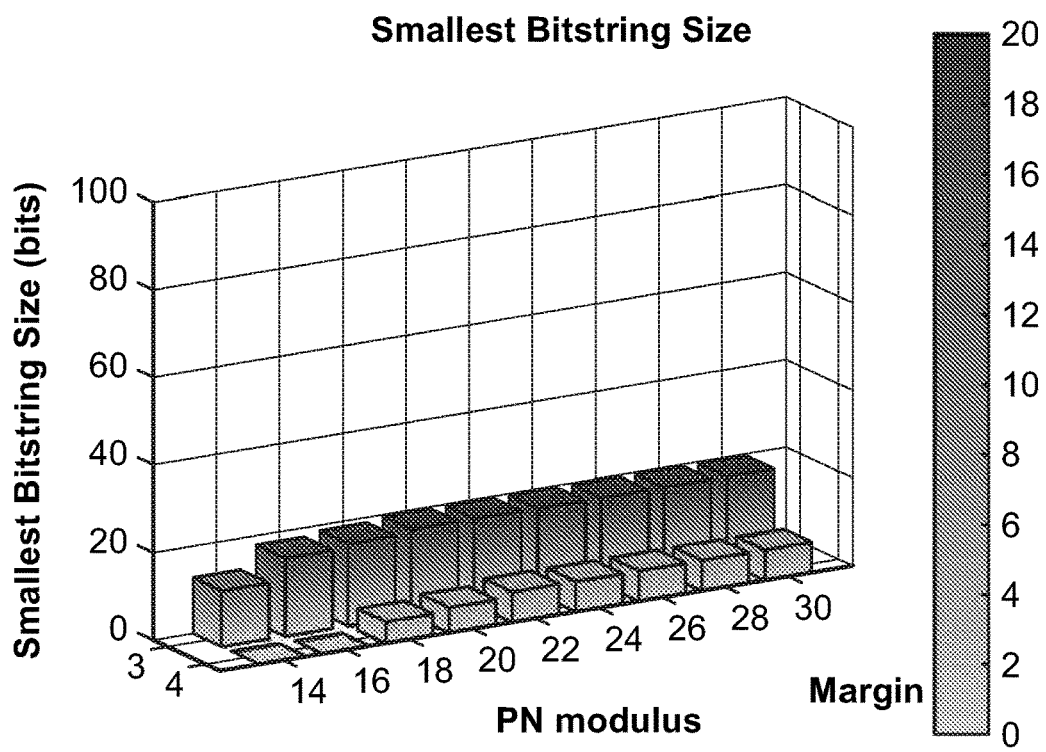
FIG. 9F illustrates a bar graph representing the statistical results for Smallest Bitstring Size according to another embodiment of the invention.

The bar graphs shown in FIG. 9A and FIG. 9B present the statistical results for InterChip hamming distance (HD). The bar graphs shown in FIG. 9C and FIG. 9D present the statistical results for Probability of Failure. And the bar graphs shown in FIG. 9E and FIG. 9F present the statistical results for Smallest Bitstring Size. FIG. 9A, FIG. 9C, and FIG. 9E are directed to SKE using redundancy settings of 5 and FIG. 9B, FIG. 9D, and FIG. 9F are directed to SKE using redundancy settings of 7. The final bitstring is constructed by using majority voting across 5 and 7 copies of strong bit sequences, respectively. The results for the nine Moduli and two Margins are shown along the x and y axes, respectively. As indicated earlier, HELP processes 2048 PN differences at a time, which produces a bitstring of length 2048 bits.

The InterChip HD is computed by pairing enrollment bitstrings (of length 2048 bits) under all combinations and is given by Equation 1:

$$HD_{inter} = \frac{1}{NCC} \sum_{i=1}^{NC} \sum_{j=i+1}^{NC} \frac{\sum_{k=1}^{NB_a}(BS_{i,1,k} \oplus BS_{j,1,k})}{NB_a} \times 100. \quad \text{(Equation 1)}$$

The symbol NC indicates the number of chips, which is 30 in these experiments, and NCC indicates the number of chip combinations, which is 30*29/2=435. The symbol $NB_a$ is the number of bits classified as strong in both bitstrings of the (i, j) pair. The subscript (i, 1, k) is interpreted as chip i, TV corner 1 (enrollment) and bit k. Hamming distance is computed by summing the XOR of the individual bits from the bitstring pair under the condition that both bits are strong (bit positions that have a weak bit in either bitstring of the pair are skipped). The HDer values computed individually using 400 different LFSR seed pairs are averaged and reported in FIG. 9A and FIG. 9B. The bar graph shows near ideal results with InterChip HDs between 48% and 51% (ideal is 50%).

The Probability of Failure results shown in FIG. 9C and FIG. 9D are computed using the $HD_{intra}$ expression given by Equation 2:

$$HD_{intra} = \frac{1}{NCC} \sum_{i=1}^{NC} \sum_{j=2}^{NT} \frac{\sum_{k=1}^{NB_e}(BS_{i,1,k} \oplus BS_{j,1,k})}{NB_e}. \quad \text{(Equation 2)}$$

Here, bitstrings from the same chip under enrollment conditions are paired with the bitstrings generated under the remaining 15 TV corners. The symbol NC is the number of chips (30), NT is the number of TV corners (16) and $NB_e$ is the number of bits classified as strong during enrollment. Note that Margining creates a Helper Data bitstring only during enrollment, which is used to select bits in the enrollment and regeneration bitstrings for the XOR operation. An average $HD_{intra}$ is computed using the values computed for each of the 400 LFSR seeds. The bar graphs plot the average $HD_{intra}$ as an exponent to $10^x$, where $10^{-6}$ indicates 1 bit flip authenticating process detects tamper attacks that modify the LUTs or routing within BulletProoF secure boot technique in an attempt to create an error in 1 million bits inspected. The best results are obtained from SKE 7 with a Margin of 4 (FIG. 9D) where the Probability of Failure is $<10^{-6}$ for Moduli≥22.

The Smallest Bitstring Size results are plotted in FIG. 9E and FIG. 9F. These results portray the worst case $NB_e$ values, which is associated with one of the chips, from the $HD_{intra}$ analysis carried out using Equation 2. The smallest bitstrings sizes (and the average bitstring sizes not shown) remain relatively constant across Moduli and are in the range of 7-12 bits per set of 2048 PN differences for Margin 4 and 20-25 for Margin 3. Therefore, to generate a 128-bit decryption key, approx. 20 LFSR seed pairs need to be processed in the worst case.

The NIST statistical test results are not shown in a graph but are summarized as follows. Unlike the previous analyses, the bitstrings used as input to the NIST software tools are the concatenated bitstrings produced across all 400 seeds for each chip. With 30 chips, NIST requires that at least 28 chips pass the test for the test overall to be considered passed. The following NIST tests are applicable given the limited size of the bitstrings: Frequency, BlockFrequency, two Cumulative-Sums tests, Runs, LongestRun, FFT, ApproximateEntropy and two Serial tests. Most of ApproximateEntropy tests fail by up to 7 chips for SKE 5, Margin 3 (all of the remaining tests are passed). For SKE 5, Margin 4, all but four of the tests passed and the fails were only by 1 chip, i.e., 27 chips passed instead of 28 chips. For SKE 7, all but 1 test is passed for Margins 3 and 4 and the test that failed (LongestRun) failed by 1 chip.

In summary, assuming the reliability requirements for the BulletProoF secure boot technique are $10^{-6}$, the HELP PUF parameters need to be set to SKE 7 and Margin 4, and the Modulus set to be >20. When these constraints are honored, the InterChip HD is >48% and nearly all NIST tests are passed. Decryption key sizes of 128 or larger may be obtained by running the HELP algorithm with 20 or more LFSR seed pairs, or by generating additional sets of 4096 PNs as configuration data is read and processed as described above.

Another PUF-based secure boot technique referred to that SASB secure boot technique is now discussed. Instead of regenerating a decryption key using bitstream configuration information as challenges according to the BulletProoF secure boot technique, the SASB secure boot technique regenerates a decryption key by measuring variations in path delays that occur in the SASB modules.

Now, the Self-Authenticated Secure Boot (SASB) approach is discussed that addresses the vulnerability of on-chip key storage. Similar to that described above, during enrollment at a secure facility, the PUF within the secure boot technique is configured to measure the path delays through components of the secure boot implementation as a means of generating an encryption key, that is then used to encrypt the second stage boot-up image, i.e., the encrypted bit-stream. Second, during regeneration in the field, the PUF regenerates the same key while simultaneously self-authenticating the bitstream. This architecture is self-authenticating because any tamper with the existing secure boot implementation changes the delay characteristics of one or more paths, which in turn, introduce bit-flip errors in the regenerated key. Failure to regenerate the enrollment key prevents the system from booting.

In addition to the two threats mentioned above, another threat is an attack in which an adversary adds additional functions to the unused portion of the PL fabric in the unencrypted bitstream. Hence, fanout may be easily added to the routing networks defined by the FPGA switch boxes, providing multiple opportunities for adversaries to add 'observation points' to, e.g., the AES key registers as a means of creating an information leakage channel. It is contemplated that during the design of the secure boot technique that custom paths are created through the FPGA routing switch boxes. These custom paths, called 'blocking paths', are designed to block all fanout points to wires which carry 'sensitive' information, e.g., wires driven by the key register. The delays of each of the 'blocking paths' is also measured and used in the key generation process. Therefore, adversaries who remove or manipulate the configuration of the blocking paths causes key regeneration to fail.

The adversarial modifications that cause path delays to change beyond a threshold create an avalanche effect, i.e., one path delay that exceeds the threshold causes a large fraction of the key bits to change. This feature is designed to prevent adversaries from carrying out multiple, incremental attacks which target one key bit (or small subsets) at a time.

Figure 10:
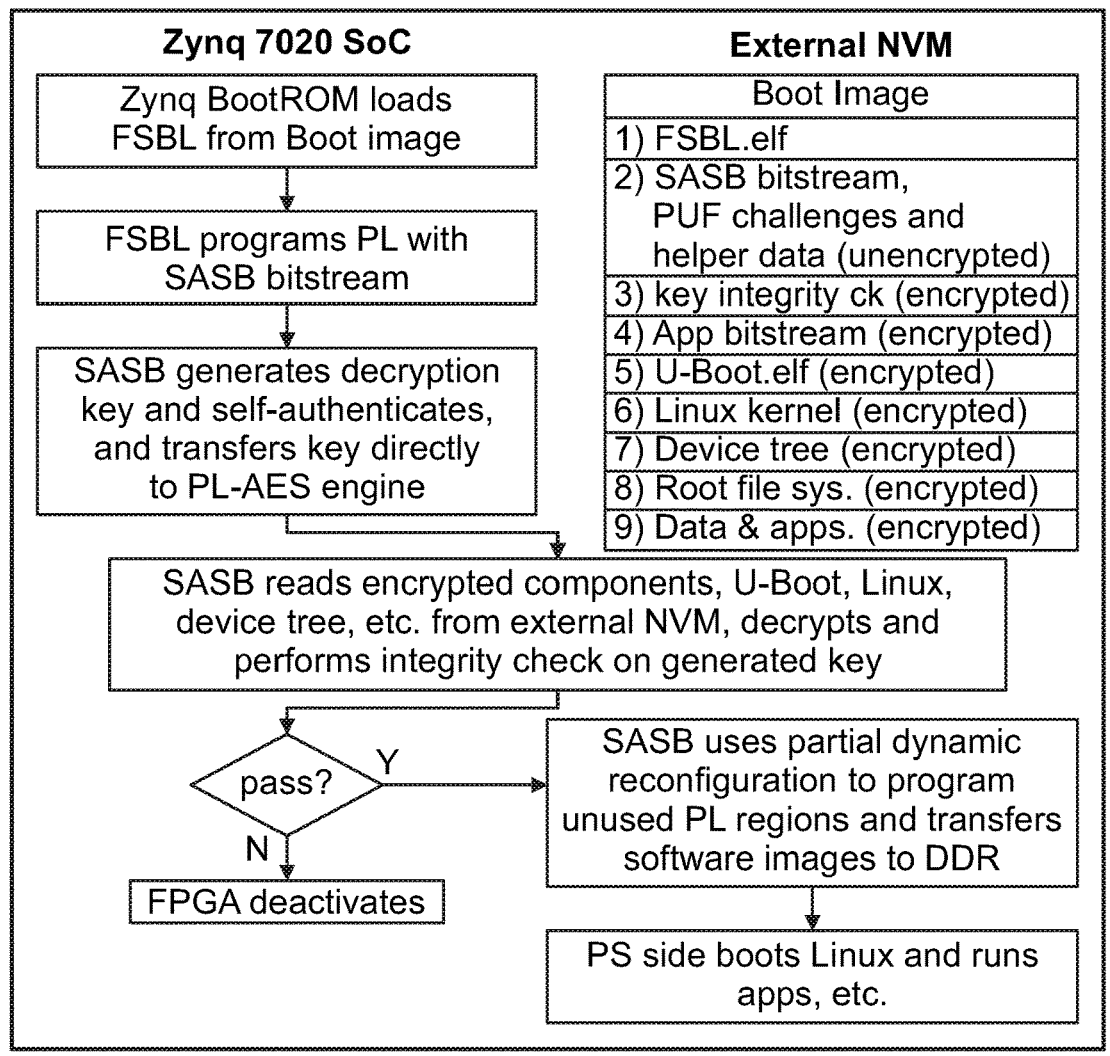
FIG. 10 illustrates a flow diagram of a method for the SASB secure boot technique according to the invention.

FIG. 10 illustrates a flow diagram of a method for the SASB secure boot technique according to the invention. The first step is identical to the BulletProoF technique shown in FIG. 2. The PL component that is programmed into the PL side by the FSBL is the unencrypted bitstream. The FSBL then passes control to SASB modules and blocks. The PUF's challenges and helper data are read from the external NVM and carries out key regeneration. The key is transferred to an embedded PL-side AES engine. The encrypted second stage boot-up image reads components labeled 3 through 9 in FIG. 10 from external NVM and transfers them to the AES engine.

An integrity check is performed at the beginning of the decryption process as a mechanism to determine if the proper key was regenerated. The first component decrypted is the key integrity check component (labeled 3 in FIG. 10). This component may be an arbitrary string or a secure hash of, e.g., U-Boot.elf, that is encrypted during enrollment and stored in the external NVM. An unencrypted version of the key integrity check component is also stored as a constant in the SASB bitstream. The integrity of the decryption key is checked by comparing the decrypted version with the SASB version. If they match, then the integrity check passes and the boot process continues. Otherwise, the FPGA is deactivated and secure boot fails.

If the integrity check passes, the SASB secure boot technique then decrypts components 4 through 9, starting with the application (App) bit-stream. An App bitstream (or blanking bitstream if the PL side is not used by the application) is programmed into the unused components of the PL side by SASB using dynamic partial reconfiguration. This ensures that any malicious functions that may have been incorporated by an adversary in unused PL regions of the SASB bitstream are overwritten (discussed more fully below). SASB then decrypts the software components, e.g., Linux, etc. and transfers them directly to DDR. The final step is to boot strap the processor to start executing the Linux OS (or bare-metal application).

Like the BulletProoF technique, the SASB technique uses a physical unclonable function to generate the decryption key as a mechanism to eliminate the vulnerabilities associated with on-chip key storage. Key generation using PUFs requires an enrollment phase, which is carried out in a secure environment, i.e., before the system is deployed to the field. The enrollment process for the SASB technique involves developing a set of challenges that are used by the PUF to generate the encryption/decryption key for AES.

During enrollment when the key is generated for the first time, the PUF accepts challenges, generates the key internally and transfers helper data off of the FPGA. As shown in FIG. 10, the challenges and helper data are stored in the external NVM unencrypted. The internally generated key is then used to encrypt the other components of the NVM by configuring AES in encryption mode. A special enrollment version of SASB is created to enable this process to be performed in a secure environment. The enrollment version performs encryption instead of decryption as is true for the in-field version but is otherwise identical.

Similar to the BulletProoF secure boot technique, the SASB technique according to the invention protects the second stage boot-up images, i.e., prevent them from being decrypted, changed, encrypted and installed back into the fielded system. In order to do so, the following security properties are supported by the invention.

First, the enrollment and regeneration processes proposed for SASB never reveal the key outside the FPGA. Therefore, physical, side-channel-based attacks are necessary in order to steal the key. Although side-channel attacks are not addressed here, it is contemplated to design SASB with side-channel attack resistance using circuit countermeasures. Second, any type of tamper with the unencrypted helper data by an adversary only prevents the key from being regenerated and a subsequent failure of boot-up process. As mentioned above, it is always possible to attack a system in this fashion, i.e., by tampering with the contents stored in the external NVM, independent of whether it is encrypted or not. A more significant concern relates to whether the helper data reveals information about the decryption key. The HELP PUF within SASB implements a helper data scheme that does not leak information about the key. Last, the proposed secure boot scheme stores an unencrypted version of the SASB bitstream. As a result, however, adversaries are free to change components of SASB and/or add additional functionality to the unused regions in the PL. This problem is addressed by using a PUF that may self-authenticate and detect tamper as discussed below with reference to the SASB technique.

The primary attack model addressed in the SASB secure boot technique is key theft. The adversary's goal is to add a key leakage channel via a hardware Trojan that provides backdoor access to the key. In order to accomplish this, the adversary must reverse engineer the unencrypted bitstream. This attack process and options available to the adversary are illustrated in FIG. 11.

Figure 11:
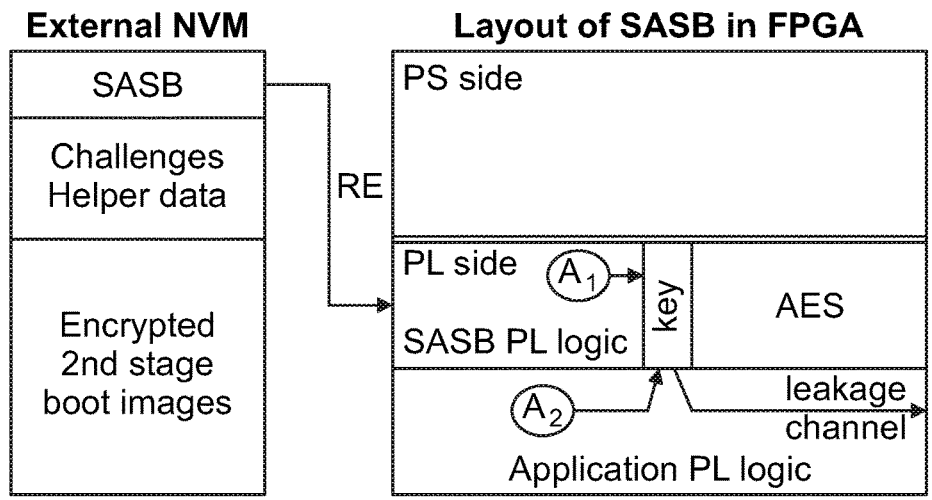
FIG. 11 illustrates a block diagram of an attack model and options available to an adversary.

The attack modifications labeled A1 in FIG. 11 involve changing wire and LUT configuration information within the SASB component of the bitstream as a means of providing back door access to the SASB key. The A2 attack modifications illustrate the addition of a hardware Trojan that accomplishes the same goal. In both cases, the high valued target is the key register. The leakage channel is created by simply adding wires that route the key information to pads on the FPGA. The back door logic added by the adversary simply waits until the key is generated, which occurs in the 3rd step of the secure boot-up process as shown on left side of FIG. 10.

The goal of SASB secure boot technique is then to prevent a valid key from being read out through the back door. A defense mechanism is implemented that detects tamper and scrambles the key if either of the modifications shown in FIG. 11 are attempted. The defense mechanism is based on measuring path delays at high resolution and then deriving the key from these measurements. Therefore, correct regeneration of the key is dependent on the delays of a set of paths. These paths measured during enrollment generate the key used to encrypt the second stage boot-up image. According to the SASB technique, the same paths are re-measured when the system is booted in the field. The path delays are measured at a resolution that may detect any type of malicious change. The key generation algorithm according to the SASB technique is constructed such that a change in any of these path delays causes a large number of bits in the key register to change. Therefore, the key read by the adversary is wrong and the system fails to boot.

SASB leverages a PUF called the Hardware Embedded Delay PUF. HELP measures path delays in arbitrarily-synthesized functional units, i.e., multi-pliers and cryptographic primitives, and uses the within-die variations that occur in these delays as a mechanism to generate a unique, device-dependent key. The current known HELP architecture is shown on the left side of FIG. 12. HELP utilizes the 'Functional Unit' as a dedicated source of entropy. The HELP Engine includes a set of modules as shown that measure path delays in the Functional Unit, and then uses these digitized delays in a key generation algorithm.

Figure 12:
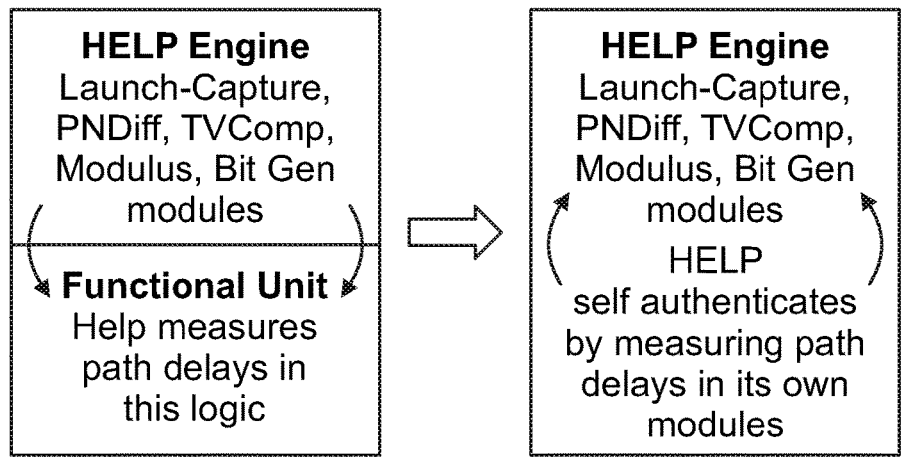
FIG. 12 illustrates a block diagram of a known HELP architecture and changes provided by the SASB secure boot technique according to the invention.

The right side of FIG. 12 shows the modified HELP architecture according to the invention, which eliminates the 'Functional Unit' and instead uses the implementation logic of the HELP engine itself as the source of entropy. As shown below, all of the modules within HELP except for the Launch-Capture module may be configured to operate in one of two modes. It should be noted that modifications to the LC module that change the behavior of the timing engine prevent the key regeneration process from completing successfully. Therefore, this module does not require a self-authentication mode. Mode 1 is the original mode, in which the module carries out its dedicated function as part of the HELP algorithm. Mode 2 is a special Launch-Capture (LC) mode that allows the Launch-Capture module to apply 2-vector sequences to its inputs (challenges) and then measure the delays of a set of paths through the modules. The digitized representation of these path delays are stored in a BRAM and used later to generate the key when the modules are switched back to Mode 1.

Figure 13:
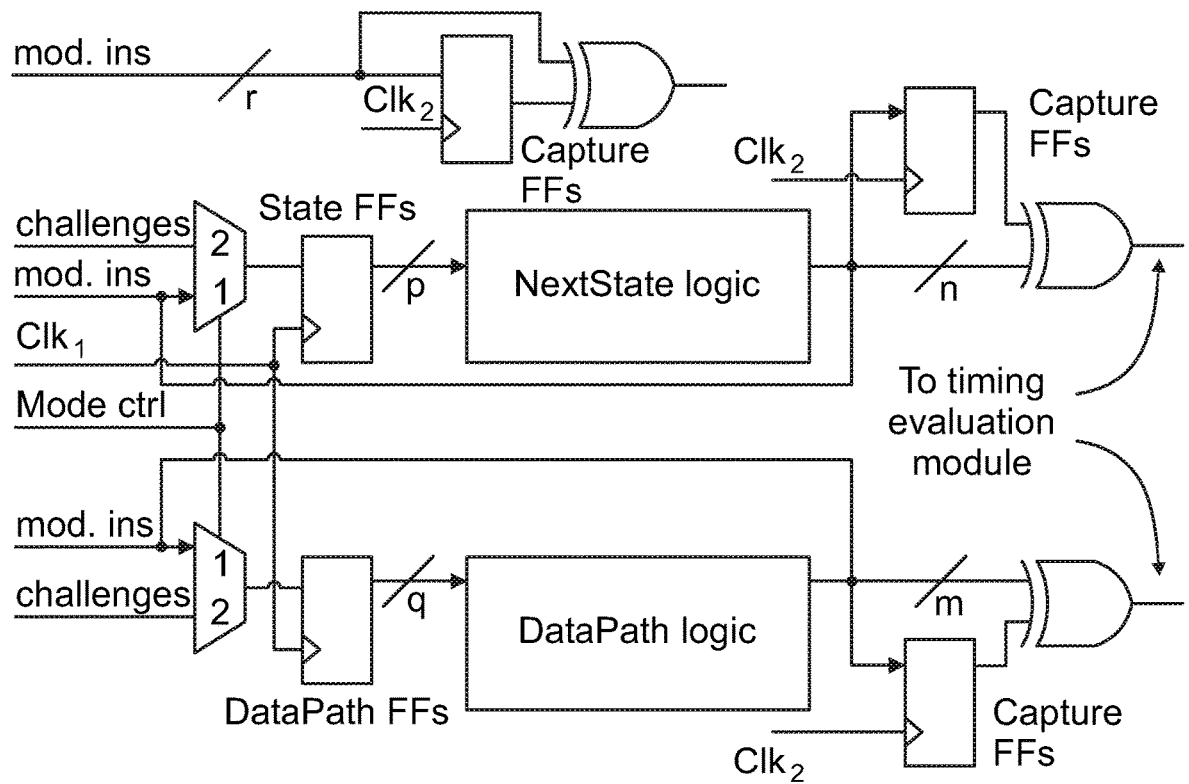
FIG. 13 illustrates a block diagram of dual-mode architecture according to the invention.

FIG. 13 illustrates a block diagram of dual-mode architecture according to the invention. All the changes are implemented in an HDL, i.e., no hand-crafting of the wires and LUTs is necessary. The original HDL modules for HELP are written in a two-segment style to enable the second mode to be easily integrated. In two-segment style, the HDL statements that describe the storage elements, i.e., the State and DataPath registers (FFs), are described in a separate process block from the HDL that describes the NextState and DataPath combinational logic.

The elements shown in grey scale represent the changes required to provide two modes of operation for each of the HELP modules. The Mode Ctrl signal is used to switch between modes. All modules within HELP are converted into this type of self-authenticating structure except for those responsible for coordinating the launch-capture (LC) tests. All of the mode-configurable modules are tested simultaneously when configured in Mode 2 to ensure that the delays of paths between modules are also included in the key generation process. The module inputs (labeled mod. ins) in FIG. 13 are fanned-out to a dedicated set of Capture FFs to allow the inter-module paths to be timed.

The resource utilization of the original HELP architecture is estimated to be approximately 6000 LUTs (including the 3000 LUTs for the functional unit). The utilization with the proposed changes is nearly equivalent because the overhead introduced by the dedicated functional unit (3000 LUTs) is eliminated in the SASB architecture, offsetting the overhead associated with the additional components shown in FIG. 13.

The HELP algorithm carries out a series of LC tests, called clock strobing. The 2-vector sequences (challenges) are delivered to the State and Datapath FFs by adding MUXs as shown on the left side of FIG. 13. Therefore, these registers also serve as the Launch FFs for Mode 2 of operation. A launch is carried out by putting the first vector, $V_1$, into these registers. The second vector, $V_2$, is then applied to the MUX inputs. On the next rising edge of $Clk_1$, transitions are launched into the combinational logic blocks. The delay of the paths is timed by capturing transitions that occur on the outputs of the combinational logic blocks by a set of Capture FFs. The Capture FFs are driven by a second clock, $Clk_2$, which is a phase shifted version of $V_1$. A digital clock manager is used to generate $Clk_2$.

Each of the challenges are applied multiple times. For each LC test, the phase shift of $Clk_2$ is incremented forward with respect to $Clk_1$ by a small $\Delta t$ (approx. 18 ps using the DCM in a Xilinx Zynq FPGA). Each of the paths driving the n and m outputs which have transitions, for one of the LC tests, succeed in propagating its transition to the corresponding Capture FF before $Clk_2$ is asserted. When this occurs, the XOR gate monitoring the output becomes 0. The first occurrence of a 0 in the repeated sequence of LC tests applied causes the controlling LC module to store the current value of the phase shift as the digitized delay for the path. The XOR=0 event occurs at different phase shifts for each of the paths so LC testing continues with larger and larger phase shifts until all paths are timed. The digitized path delays are stored in a BRAM for processing later by the HELP algorithm in Mode 1.

The challenges are designed in advance to provide complete coverage, i.e., all LUTs are tested using at least one delay test. Therefore, any changes to the logic functions implemented within the LUTs, and any wiring changes to the inputs or outputs of the LUTs change the delay characteristics of the measured paths. Adversaries may also snoop on data values that are produced during key regeneration (Mode 1) as a mechanism to steal the key. This may be achieved by adding fanout branches to the existing wires. Unfortunately, the corresponding changes in the path delays are too small to be detected by the SASB secure boot technique. Hence, a separate mechanism for dealing with fanout branch insertion is discussed below.

Figure 14:
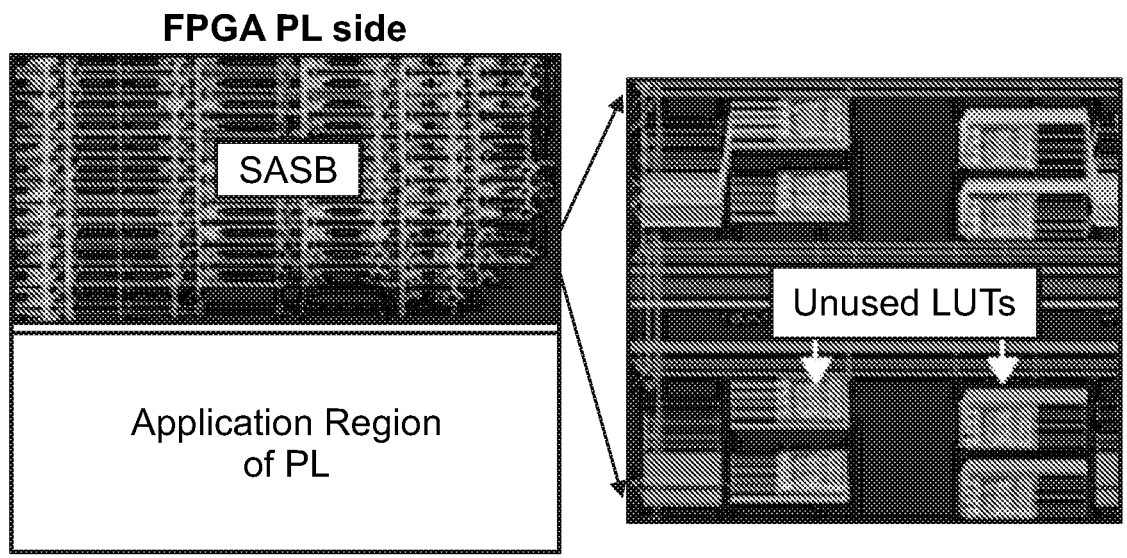
FIG. 14 illustrates an implementation view diagram including a SASB isolation region according to the invention.

The SASB secure boot technique is designed to minimize its usage of PL resources as a means of maximizing the resources available for an application bitstream. Moreover, an embodiment of the SASB secure boot technique is configured into a Xilinx pblock as shown in FIG. 14. This region shown in FIG. 14 is referred to as an isolation region because the LUTs and switch boxes within this region are used either by the SASB modules or are configured into dummy paths and timed in the same fashion as described for Mode 2 operation of the SASB modules. Unlike the "fence" construct proposed by Xilinx, the isolation region is fundamentally different and implements an active self-authentication mechanism against tamper.

The unused LUTs are identified using a 'tcl' script once the synthesis completes. Several unused LUTs are shown on the right side of FIG. 14. Dummy paths are constructed by creating a path through these LUTs with the endpoints connected to a Launch and Capture FF. The objective is to create dependencies between key generation and all of the unused LUT resources within the isolation region as a mechanism to prevent adversaries from using these LUTs to construct a key snooping Trojan.

The tactic of stringing together the unused LUTs into structural paths does not address Trojans that create paths from, e.g., the key register, directly to the FPGA I/Os. LUT resources are not required to create routes. Instead, the switch boxes must be protected. This may be accomplished by preventing adversaries from creating fanouts on wires connected to the registers that store the regenerated key (other wires that process sensitive information related to the key may also be treated in this fashion). The basic idea is to route fanout-blocking paths through switch boxes used to route key information. The switch boxes provide the only opportunity for adversaries to create fanout to these wires. The fanout-blocking paths effectively use all of the available fanout connections through the switch that may be connected to the key register.

Figure 15:
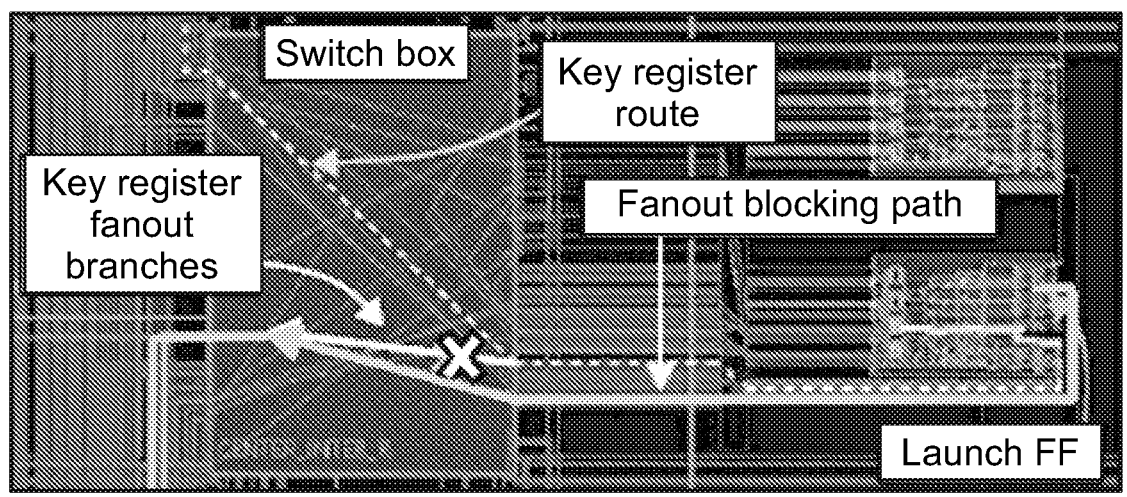
FIG. 15 illustrates an implementation view diagram including fanout branches within a Xilinx switch box according to the invention.

An example of a fanout-blocking-path is shown in FIG. 15. A key bit is generated and stored in the LUT shown on the right. The wire shown in solid white routes from the key register to another component in the isolation region, e.g., an input to AES. The point at which the solid white wire enters the switch box on the right represents a vulnerability. The switch box allows fanout connections to be made to wires passing through the switch box. The white dotted wire shows an example of a fanout connection that may be made to the wire shown in solid white. In Xilinx Zynq-7000 FPGAs, the number of possible fanouts (PIPs) permitted in a switch box node is 32. These fanout branch options are identified within the switch boxes used to route the key register bits and add fanout-blocking paths, such as the one shown in grey. A launch and capture FF are added to the endpoints of the fanout-blocking paths (the wire shown in grey is driven from one as shown on the right in the figure) to allow these paths to be timed, and participate in the key generation process. Adversaries who attempt to re-route the fanout-blocking path to gain access to the fanout connection change the delay of the path, which results in key generation failure. Therefore, the key bit snooped is purposely corrupted by the SASB approach because of the change in the path delay.

The security of the proposed scheme is rooted in the ability to detect changes to the routing of existing wires within the SASB modules and to the fanout-blocking paths. Now discussed are the results that show the change in delay from minimal changes to the routing configuration of a path. The data is obtained from measurements on a Xilinx Zynq 7020 using the timing engine implemented within the SASB module.

Manually-routed paths through two switch boxes between two adjacent slices are created, such as through a Vivado implementation. A second configuration is created that adds one additional switch box to the path, to model an adversarial attack that attempts to re-route a fanout-blocking path represented by the first configuration. The delay of the first configuration is 558 ps while the second configuration adds 72 ps. The increased delay in this 'hardest-to-detect' attack model is large enough to cause a bit flip error in the HELP bitstring generation algorithm.

As indicated, the adversary may place a key snooping Trojan circuit into the unused Application Region of the PL. An effective countermeasure to preventing this is to enable SASB to write a blanking bitstream into the Application Region using the Xilinx ICAP interface before the key is generated. This blanking bitstream countermeasure destroys the Trojan before it may be activated. The SASB technique includes a module that performs a partial dynamic reconfiguration on the Application Region of PL from FIG. 14 using a state machine that automatically generates blanking data required by the ICAP interface. Given that SASB is unencrypted, the adversary might attempt to disable this state machine or change its functionality. As a countermeasure, SASB also self-authenticates the blanking bitstream state machine as part of the key generation process. This may also be used to eliminate the requirements for fanout-blocking paths in the isolation region. By moving the SASB module away from the edges of the design to allow the blanking region to surround SASB, any attempt to create routes that leak the key register to I/O would be eliminated by the blanking bitstream operation.

In order to prevent incremental attacks, the key generation process creates dependencies between the bitstrings generated by HELP and the AES key. Therefore, any single bit flip that occurs in the HELP bitstrings because of tamper to a path propagates to multiple key bits. The avalanche effect is a well know property of secure hashing algorithms such as the SHA-3. Therefore, the bitstrings generated by the HELP algorithm, as components of SASB are self-authenticated, are used as input to a SHA-3 implementation embedded within the SASB bitstream. The digest is then used as the AES key to decrypt the second stage boot loader images.

It should be noted that the avalanche effect behavior of SHA-3 does not increase the reliability requirements of the PUF. This is true because key regeneration has zero tolerance to bit flip errors, and is independent of the hashing operation. However, key regeneration is being performed over a much larger sequence of bits and therefore, the reliability requirements of the HELP algorithm are increased by a factor proportional to the compression performed by the hashing operation. The HELP algorithm includes several reliability-enhancing techniques and corresponding parameters that may be tuned to increase the reliability of HELP's bitstring regeneration process to achieve a specific requirement for key regeneration.

While the disclosure is susceptible to various modifications and alternative forms, specific exemplary embodiments of the invention have been shown by way of example in the drawings and have been described in detail. It should be understood, however, that there is no intent to limit the disclosure to the particular embodiments disclosed, but on the contrary, the intention is to cover all modifications, equivalents, and alternatives falling within the scope of the disclosure as defined by the appended claims.

The invention claimed is:

1. A method for an autonomous, self-authenticating and self-contained secure boot-up process for FPGAs, wherein the method leverages PUFs to generate a decryption key at boot-up time for decrypting a second stage boot-up image and the method further comprises a SHA-3 hash algorithm operable in a functional mode and a PUF mode.

2. The method according to claim 1, wherein the secure boot-up process boots from an unencrypted bitstream.

3. The method according to claim 2, wherein configuration data of the FPGA with the unencrypted bitstream is read out and used as challenges to the PUF.

4. The method according to claim 3, wherein any tamper that occurs with an externally stored unencrypted bitstream results in failure to generate a correct decryption key.

5. The method according to claim 4, wherein the failure to generate the correct decryption key results in a failure to unencrypt the second stage boot-up image.

6. The method according to claim 5, wherein tamper results in the fielded device failing to boot-up.

7. The method according to claim 1, wherein the functional mode is configured to produce digests of configuration data that are later used as challenges for the PUF.

8. The method according to claim 1, wherein the PUF mode is configured to use path delays within the SHA-3 hash algorithm to represent a source of entropy for generation of a unique and unclonable encryption/decryption key.

9. The method according to claim 1 further comprising time-to-digital-converter including a calibration method to obtain precise timing measurements of path delays in an entropy source.

10. The method according to claim 9, wherein the entropy source is a SHA-3 hash algorithm.

11. The method according to claim 1, wherein a clock is generated using a ring oscillator to eliminate use of a Xilinx multi-mode clock manager.

12. The method according to claim 1, wherein embedded hardwired security features on the FPGA are not utilized.

13. The method according to claim 1, wherein the PUF mode is configured to use path delays within components that implement the HELP algorithm itself.

14. The method according to claim 1, wherein the PUF mode is configured to use path delays between components of the Xilinx internal access configuration register and the entire secure boot-up implementation.

15. The method according to claim 1, wherein the PUF mode is configured to use path delays surrounding the entire secure boot-up implementation to provide a guard band preventing adversaries from adding information leakage channels to the secure boot-up implementation.

16. The method according to claim 1 further comprising a time-to-digital converter for obtaining high resolution measurements of path delays, which leverages the on-chip embedded carry chain components of the FPGA, to eliminate use of a Xilinx multi-mode clock manager.

17. The method according to claim 1, wherein the second stage boot-up image comprises an application that runs in a fielded device.

18. A boot-up process method for a field programmable gate array (FPGA) comprising the steps of:
during an enrollment phase,
loading by a first stage boot loader (FSBL) an unencrypted bitstream into the FPGA;
generating an encryption key from the unencrypted bitstream;
using the encryption key to encrypt a second stage bootloader image;
storing the unencrypted bitstream and the encrypted second stage bootloader image in an external non-volatile memory (NVM);
during a regeneration phase,
reading from the NVM the encrypted second stage bootloader image;
generating a decryption key from the unencrypted bitstream;
decrypting the encrypted second stage bootloader image using the decryption key.

19. The boot-up process method according to claim 18, wherein the decryption key is destroyed after the decrypting step.

20. The boot-up process method according to claim 18, wherein a physical unclonable function (PUF) is used to generate the decryption key.

21. The boot-up process method according to claim 20, wherein the decryption key is generated by measuring variations in path delays.

22. A FPGA comprising an autonomous, self-authenticating and self-contained secure boot-up process that leverages PUFs to generate a decryption key at boot-up time for decrypting a second stage boot-up image and the FPGA further comprises a SHA-3 hash algorithm operable in a functional mode and a PUF mode.

23. The FPGA according to claim 22, wherein the secure boot-up process boots from an unencrypted bitstream.

24. The FPGA according to claim 22, wherein configuration data of the FPGA with the unencrypted bitstream is read out and used as challenges to the PUF.

* * * * *